(12) United States Patent
Kasegawa

(10) Patent No.: US 9,632,387 B2
(45) Date of Patent: Apr. 25, 2017

(54) DISPLAY UNIT AND ELECTRONIC APPARATUS

(71) Applicant: Sony Corporation, Tokyo (JP)

(72) Inventor: Ryo Kasegawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 14/384,906

(22) PCT Filed: Feb. 14, 2013

(86) PCT No.: PCT/JP2013/053476
§ 371 (c)(1),
(2) Date: Sep. 12, 2014

(87) PCT Pub. No.: WO2013/145914
PCT Pub. Date: Oct. 3, 2013

(65) Prior Publication Data
US 2016/0187755 A1   Jun. 30, 2016

(30) Foreign Application Priority Data

Mar. 27, 2012 (JP) ................. 2012-071482

(51) Int. Cl.
| | | |
|---|---|---|
| *G02F 1/167* | (2006.01) | |
| *G02F 1/1335* | (2006.01) | |
| *G02B 5/20* | (2006.01) | |
| *G02B 26/02* | (2006.01) | |

(52) U.S. Cl.
CPC ........ *G02F 1/167* (2013.01); *G02F 1/133514* (2013.01); *G02B 5/201* (2013.01); *G02B 26/026* (2013.01)

(58) Field of Classification Search
CPC ....................................... G02F 1/167
USPC .......................................... 359/296
See application file for complete search history.

(56) References Cited

U.S. PATENT DOCUMENTS

| | | | |
|---|---|---|---|
| 3,892,568 A | 7/1975 | Ota | |
| 2007/0024954 A1* | 2/2007 | Sakamoto | G02F 1/133514 359/296 |

FOREIGN PATENT DOCUMENTS

| | | |
|---|---|---|
| JP | 50-015115 | 6/1975 |
| JP | 2007-041169 A | 2/2007 |
| JP | 4188091 B2 | 11/2008 |
| JP | 2009-003179 A | 1/2009 |
| JP | 2011-018007 A | 1/2011 |
| JP | 2011-065032 A | 3/2011 |
| JP | 2011-095339 A | 5/2011 |
| JP | 2011-237544 A | 11/2011 |

* cited by examiner

*Primary Examiner* — James Jones
(74) *Attorney, Agent, or Firm* — Chip Law Group

(57) ABSTRACT

A display unit includes: a display layer including a plurality of pixels each including an electrophoretic device; and a color filter provided on a display side of the display layer and including filter layers each having one of a plurality of colors, the filter layers facing the respective pixels, in which a distance between the display layer and the color filter is not more than 25 percent of a pixel pitch in the display layer.

13 Claims, 17 Drawing Sheets

|     | x     | y     |
|-----|-------|-------|
| Ro  | 0.542 | 0.318 |
| Go  | 0.304 | 0.495 |
| Bo  | 0.188 | 0.140 |

DISPLAY UNIT AND ELECTRONIC APPARATUS

TECHNICAL FIELD

The present disclosure relates to a display unit and an electronic apparatus that utilize electrophoresis phenomenon to display an image.

BACKGROUND ART

In recent years, demand for a display unit having low power consumption and high image quality has been increased as various electronic apparatuses such as a mobile phone or a mobile information terminal device (PDA) have become widespread. In particular, in accordance with the birth of electronic-book delivery business, attention has been recently paid to an electronic book terminal for reading application that is used for a purpose of reading literal information for a long time. A display unit having a display quality suitable for that application has been therefore desired.

For the reading application, there has been proposed a display unit of a cholesteric liquid crystal type, an electrophoretic type, an electric redox type, a twist-ball type, etc. In particular, a display unit classified into that of a reflective type may be preferable. This is because the reflective display unit utilizes reflection (scattering) of outside light to perform bright display as with paper, and therefore achieves display quality close to that of the paper. It is also because consumed power is suppressed as a result of unnecessity of a backlight.

A leading candidate of the reflective display unit is an electrophoretic display unit that utilizes electrophoresis phenomenon to generate brightness and darkness (contrast). This is because the electrophoretic display unit is low in power consumption and superior in high-speed responsiveness. Accordingly, various considerations have been made on a display method of the electrophoretic display unit.

Specifically, there is proposed a method in which two kinds of charged particles that have different optical reflection characteristics and different polarities are dispersed in insulating liquid, and the difference in polarity is utilized to move the respective charged particles (for example, see Patent Literatures 1 and 2). In this method, distribution of the two kinds of charged particles varies depending on an electric field, and contrast is generated thereby utilizing the difference in optical reflection characteristics.

CITATION LIST

Patent Literature

Patent Literature 1: Japanese Unexamined Patent Application Publication (Translation of PCT Application) No. S50-015115

Patent Literature 2: Japanese Patent No. 4188091

SUMMARY OF THE INVENTION

An electrophoretic display unit utilizes contrast of reflected light to perform display as described above, and therefore performs monochrome display basically. However, the electrophoretic display unit is also allowed to perform color display by combining color filters. It is desired to improve display quality, for example, to improve gamut or the like in an electronic paper display that performs color display.

It is therefore desirable to provide a display unit and an electronic apparatus that are capable of improving display quality at the time of performing color display while utilizing the electrophoresis phenomenon.

A display unit of an embodiment of the present disclosure includes: a display layer including a plurality of pixels each including an electrophoretic device; and a color filter provided on a display side of the display layer and including filter layers each having one of a plurality of colors, the filter layers facing the respective pixels, in which a distance between the display layer and the color filter is not more than 25 percent of a pixel pitch in the display layer.

An electronic apparatus of an embodiment of the present disclosure includes the above-described display unit of the embodiment of the present disclosure.

In the display unit and the electronic apparatus of the embodiments of the present disclosure, the color filter is provided on the display side of the display layer that includes an electrophoretic device for each of the pixels. The color filter includes the filter layers that face the respective pixels in the display layer, and each have one of the plurality of colors. In the display layer, diffusely-reflected light of the electrophoretic device passes through the color filter, and color display is thus performed at the time of displaying an image. The utilization of diffuse reflection causes leakage of part of light exited from each of the pixels into an adjacent pixel (display light of another color) at this time, which easily causes degradation in gamut, variation in chromaticity depending on a viewing angle, etc. Such degradation in gamut and variation in chromaticity depending on a viewing angle is suppressed by causing the distance between the color filter and the display layer to be not more than 25% of the pixel pitch.

Specifically, the variation in chromaticity described above resulting from at least leakage of R light into a G pixel is effectively suppressed (to an extent almost unperceivable by human eyes) by causing the distance between the color filter and the display layer to be not more than 25% of the pixel pitch.

Moreover, the distance between the color filter and the display layer may be desirably not more than 17% of the pixel pitch. This effectively suppresses also the variation in chromaticity resulting from leakage of B light into the G pixel, in addition to that resulting from the leakage of the R light into the G pixel described above. The distance between the color filter and the display layer may be more desirably not more than 10% of the pixel pitch. This effectively suppresses also variation in chromaticity resulting from leakage of the R light into a B pixel, in addition to the variation in chromaticity with respect to the G pixel described above. The distance between the color filter and the display layer may be further more desirably not more than 9% of the pixel pitch. This effectively suppresses variation in chromaticity resulting from leakage of G light into an R pixel in addition. Moreover, the distance between the color filter and the display layer may be ideally not more than 7% of the pixel pitch. This effectively suppresses variation in chromaticity resulting from each of leakage of the B light into the R pixel and leakage of the G light into the B pixel in addition. In other words, by causing the distance between the color filter and the display layer to be not more than 7%, visibility of color upon obliquely observing a screen is made equivalent to that upon observing the screen from the front in a case of performing color display using three colors of R, G, and B (or four colors of R, G, B, and W).

According to the display unit and the electronic apparatus of the embodiments of the present disclosure, the color filter that has the filter layers of predetermined colors facing the respective pixels is provided on the display side of the display layer that includes the electrophoretic device for each of the pixels, and the distance between the color filter and the display layer is not more than 25% of the pixel pitch. This suppresses degradation in gamut and dependency of chromaticity on viewing angle. It is therefore possible to improve display quality at the time of performing color display while utilizing the electrophoresis phenomenon.

MODES FOR CARRYING OUT THE INVENTION

An embodiment of the present disclosure is described below in detail with reference to the drawings. Incidentally, the description is provided in the following order.
1. Embodiment (Display Unit)
   1-1. Configuration
   1-2. Manufacturing Method
   1-3. Operation
2. Application Examples (Electronic Apparatuses)

Embodiment

Configuration

Figure 1:
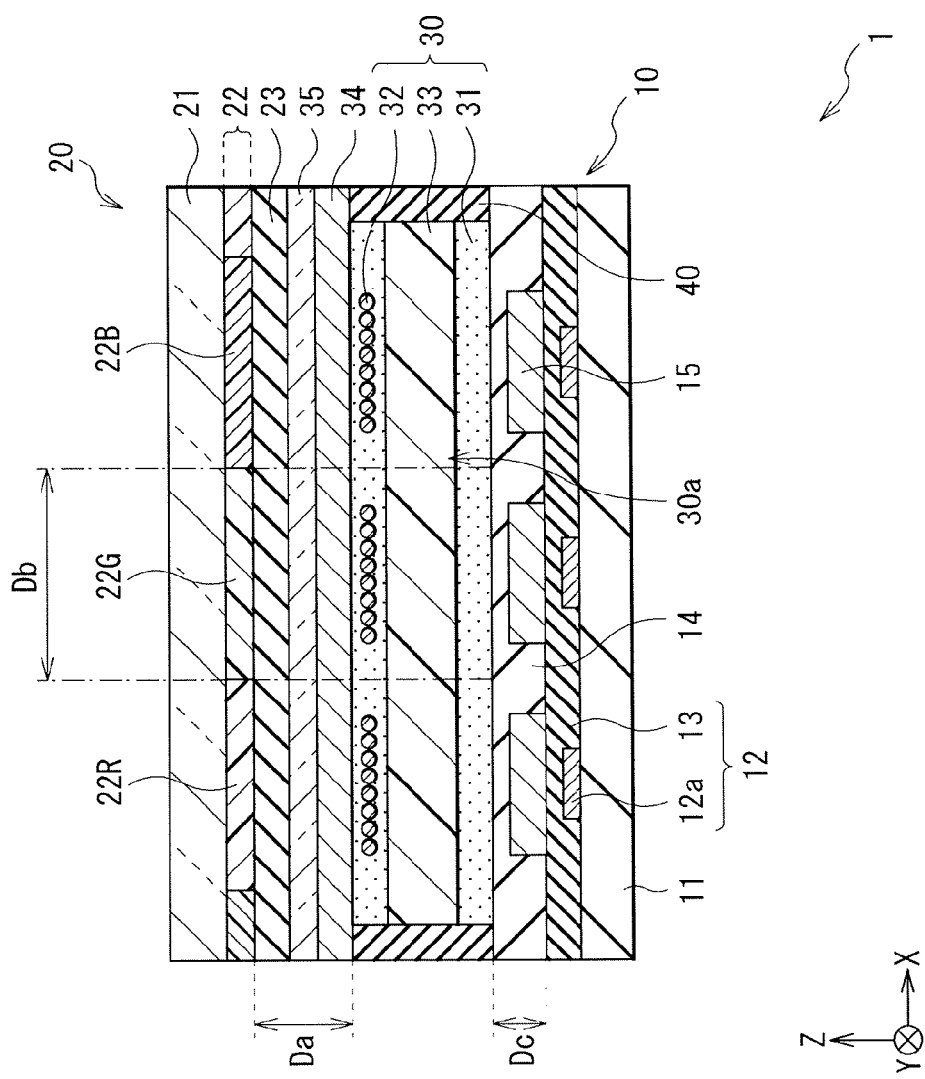
FIG. 1 is a cross-sectional view illustrating a configuration of a display unit of an embodiment of the present disclosure.

FIG. 1 illustrates a cross-sectional configuration of a display unit (a display unit 1) of an embodiment of the present disclosure. The display unit 1 is a display unit that utilizes electrophoresis phenomenon to display an image, which is a so-called electronic paper display. The display unit 1 may include, for example, a display layer 30 including an electrophoretic device 30a between a drive substrate 10 and a display substrate 20. The drive substrate 10 and the display substrate 20 are arranged to face each other with a spacer 40 in between. In the display unit 1, a plurality of pixels may be arranged two-dimensionally in a matrix, and a color filter 22 is formed in the display substrate 20. This achieves color image display. It is to be noted that, in the present embodiment, "pixel" refers to a sub-pixel that corresponds to one of three colors of R, G, and B (or four colors of R, G, B, and W), and the sub-pixels of these three colors (or the four colors) configure one pixel.

[Drive Substrate 10]

The drive substrate 10 may include, for example, a TFT layer 12, an adhesive layer 14, and pixel electrodes 15 that are laminated in order on a surface of a support base 11. The TFT layer 12 may include thin-film transistors (TFTs) 12a. The TFTs 12a and the pixel electrodes 15 may be, for example, formed in a matrix in a divided manner in accordance with an arrangement of the pixels, configuring an active-matrix drive circuit.

The support base 11 may be formed, for example, of one or more of inorganic materials, metal materials, plastic materials, and the like. Examples of the inorganic material may include silicon (Si), silicon oxide ($SiO_x$), silicon nitride ($SiN_x$), and aluminum oxide ($AlO_x$). Examples of the silicon oxide may include glass and spin-on-glass (SOG). Examples of the metal material may include aluminum (Al), nickel (Ni), and stainless steel. Examples of the plastic material may include polycarbonate (PC), polyethylene terephthalate (PET), polyethylene naphthalate (PEN), polyetyletherketone (PEEK), cycloolefin polymer (COP), polyimide (PI), and polyethersulfone (PES).

The support base 11 may transmit light, or may not transmit light. Further, the support base 11 may be a substrate having rigidity such as a wafer, or may be a thin-layer glass, a film, or the like having flexibility. However, the support base 11 may be desirably made of a material having flexibility because a flexible (bendable) electronic paper display is achieved thereby.

The TFT 12a is a switching device for selecting a pixel. The TFT 12a may serve, for example, as a channel layer (an active layer), and may be configured of an inorganic TFT that uses an inorganic semiconductor layer made of amorphous silicon, polysilicon, oxide, or the like, or may be configured of an organic TFT that uses an organic semiconductor layer made of pentacene or the like. In the TFT layer 12, the TFT 12a may be covered, for example, with a protective layer 13. For example, a planarization insulating film (which is not illustrated) may be further provided on the protective film 13. The planarization insulating film may be made, for example, of an insulating material such as polyimide.

The adhesive layer 14 may be formed when the display layer 30 is formed on the TFT layer 12. The adhesive layer 14 may be made, for example, of acrylic-based resin, urethane-based resin, or rubber, and may have a thickness, for example, from 1 μm to 100 μm. It is to be noted that, for example, an anion-based additive, a cation-based additive, a lithium-salt-based additive, or the like may be added to the adhesive layer 14 in order to allow the adhesive layer 14 to have conductivity.

The pixel electrode 15 may include, for example, one or more of conductive materials such as gold (Au), silver (Ag), and copper (Cu). The pixel electrode 15 is electrically connected to the TFT 12a. It is to be noted that the number of the TFT 12a to be arranged for one pixel electrode 15 may be any number, is not limited to one, and may be two or more.

[Display Substrate 20]

The display substrate 20 may include, for example, the color filter 22, a bonding layer 23, a transparent base 35, and a counter electrode 34 that are laminated in order on a one surface side (on a display layer 30 side) of a transparent base 21.

The transparent base 21 may be made of a material that is similar to that of the support base 11 except for transmitting light. This is because the transparent base 21 needs to transmit light since an image is displayed on a top surface side of the display substrate 20. The transparent base 21 may have a thickness, for example, from 1 μm to 250 μm.

The color filter 22 may include, for example, filter layers each having a predetermined color (here, a red filter layer 22R, a green filter layer 22G, and a blue filter layer 22B) and facing each of the pixel. The colors, the number, the arrangement, etc. of the filter layers in the color filter 22 are arbitrary. Some examples of combinations thereof are illustrated in FIGS. 2A to 2C.

Figure 2A:
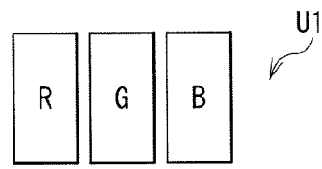
FIG. 2A is a schematic diagram illustrating an example of color arrangement of pixels.

FIG. 2A illustrates an example of a color arrangement in the color filter 22 in a case where three colors of R (red), G (green), and B (blue) are used to perform color display. Specifically, as illustrated in FIG. 2A, an arrangement is used in which the filter layers of the respective colors of R, G, and B are arranged side by side in a line in one direction (a unit region U1). In this case, three pixels corresponding to the unit region U1 in the color filter 22 are considered sub-pixels to form one pixel.

Figure 2B:
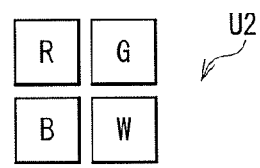
FIG. 2B is a schematic diagram illustrating an example of color arrangement of pixels.
Figure 2C:
FIG. 2C is a schematic diagram illustrating an example of the color arrangement of the pixels.

FIGS. 2B and 2C each illustrate an example of color arrangement in the color filter 22 in a case where four colors in total are used to perform color display. The four colors may include W (white) in addition to R, G, and B. In the present embodiment, description is provided of the case where the three colors of R, G, and B are used to perform color display; however, the four colors additionally including W may be used. In this case, specifically, a region corresponding to W may be provided in addition to filter regions of the three colors of R, G, and B, which may be arranged in a region (a unit region U2) of a two-by-two matrix as illustrated in FIG. 2B. Alternatively, a color arrangement (a unit region U3) in which the respective regions of R, G, B, and W are arranged side by side in a line in one direction may be used as illustrated in FIG. 2C. Out of these, the region corresponding to W may be provided with no color filter layer, unlike in the respective regions of R, G, and B. Monochrome display is thus performed in the region corresponding to W. In such a case, four pixels corresponding to each of the unit regions U2 or U3 in the color filter 22 are considered sub-pixels to configure one pixel.

It is to be noted that the color filter 22 may be directly drawn on a surface of the transparent base 21. Alternatively, the color filter 22 may be fixed to the transparent base 21 with a bonding agent or the like in between. Further, each of center positions of the red filter layer 22R, the green filter layer 22G, and the blue filter layer 22B may desirably coincide with a center position of each of the pixels (the pixel electrodes 15) as much as possible. Specifically, alignment may be desirably made so that displacement between the center position of each of the filter layers and the center position of the pixel electrode 15 is within 10% of a pixel pitch (Db).

The bonding layer 23 may be a layer formed for attaching the color filter 22 to the transparent base 35. The bonding layer 23 may be made of ultraviolet (UV) curable resin or the like that transmits light. Examples of such a resin material may include acrylic-based resin, epoxy-based resin, and polyester-based resin. The bonding layer 23 may have a thickness, for example, from 0.1μ to 50 μm.

The transparent base 35 may be made of a material that is similar to that of the support base 11, except for transmitting light. The transparent base 35 may have flexibility, or may have rigidity. This is because the transparent base 35 needs to transmit light since an image is displayed on the display substrate 20 side. The transparent base 35 may have a thickness, for example, from 0.1 μm to 125 μm, which may be set to an appropriate value based on the pixel pitch Db described later.

The counter electrode 34 may include, for example, one or more of conductive materials (transparent conductive film materials) that transmit light. Examples of such a conductive material may include indium-tin oxide (ITO), antimony-tin oxide (ATO), fluorine-doped tin oxide (FTO), and aluminum-doped zinc oxide (AZO). The counter electrode 34 may have a thickness, for example, from 0.001 μm to 1 μm. It is to be noted that the counter electrode 34 may be formed, for example, on the entire surface of the transparent base 35; however, the counter electrode 34 may be formed in a divided manner as with the pixel electrodes 15.

When an image is displayed on the display substrate 20 side, the electrophoretic device 30a is viewed through the counter electrode 34. For this reason, the counter electrode 34 may preferably have light transmittance as high as possible, for example, not lower than 80%. Further, the counter electrode 34 may preferably have electrical resistance as low as possible, for example, not higher than 100Ω/☐ (square).

Here, in the present embodiment, a distance (Da) between the color filter 22 and the display layer 30 is set to be not more than 25% of the pixel pitch Db in the above-described display substrate 20. Moreover, the distance Da may be desirably not more than 17% thereof, may be more desirably not more than 10% thereof, and may be further more desirably not more than 9% thereof, which is described in detail later. However, the distance Da may ideally set to be not more than 7% of the pixel pitch Db. Such optimization in the distance Da effectively suppresses degradation in visibility caused by leakage of the respective color lights into the adjacent pixels when color display is performed using the three colors of R, G, and B (or the four colors of R, G, B, and W). Alternatively, the distance Da may be set to be less than 12% of the pixel pitch Db.

In the display substrate 20, the thicknesses of the respective layers between the display layer 30 and the color filter 22 are set appropriately depending on the pixel pitch Db so that the above-described distance Da is set.

It is to be noted that the pixel pitch Db corresponds to a width or an arrangement cycle of the pixels (sub-pixels), and specifically corresponds to a distance between the center positions of the pixel electrodes 15 adjacent to each other. For example, the pixel pitch Db may be from 1 μm to 1500 μm, and may be desirably from 100 μm to 200 μm. However, the pixel pitch Db is not particularly limited to values in the forgoing ranges.

[Display Layer 30]

The display layer 30 includes the electrophoretic device 30a that may be, for example, controlled by a voltage for each pixel. The electrophoretic device 30a utilizes the electrophoresis phenomenon to generate contrast, and may include electrophoretic particles 32 that are allowed to be move between the pixel electrode 15 and the counter electrode 34 in response to an electric field. In detail, the electrophoretic device 30a may include, for example, a porous layer 33 together with the electrophoretic particles 32 in insulating liquid 31. It is to be noted that, here, the insulating liquid 31 and the porous layer 33 that configure the electrophoretic device 30a are provided to be shared by the respective pixels.

The insulating liquid 31 may include, for example, one or more of non-aqueous solvents such as organic solvents, and may be specifically configured to include paraffin, isoparaffin, etc. The insulating liquid 31 may preferably have viscosity and a refractive index that are as low as possible. One reason for this is because mobility (response speed) of the electrophoretic particles 32 is thereby improved and energy (consumed power) necessary for the movement of the electrophoretic particles 32 is lowered accordingly. Another reason is because a difference between the refractive index of the insulating liquid 31 and a refractive index of the porous layer 33 is increased and light reflectance of the porous layer 33 is therefore increased. It is to be noted that weakly-conductive liquid may be used instead of the insulating liquid 31.

It is to be noted that the insulating liquid 31 may include various materials on a necessary basis. Examples of such materials may include a colorant, a charge controlling agent, a dispersion stabilizer, a viscosity modifier, a surfactant, and resin.

The electrophoretic particles 32 are one or more charged particles that are electrically movable, and are dispersed in the insulating liquid 31. The electrophoretic particle 32 is allowed to move between the pixel electrode 15 and the counter electrode 34 in the insulating liquid 31. The electrophoretic particle 32 may be configured, for example, of particles (powder) of one or more of organic pigment, inorganic pigment, dye, carbon material, metal material, metal oxide, glass, polymer material (resin), etc. It is to be noted that the electrophoretic particle 32 may be configured of a crushed particle, a capsule particle, or the like of solid resin that includes the above-described particle. However, materials belonging to the carbon material, the metal material, the metal oxide, the glass, or the polymer materials are excluded from materials belonging to the organic pigment, the inorganic pigment, or the dye.

Examples of the organic pigment may include azo-based pigment, metal-complex azo-based pigment, polycondensed azo-based pigment, flavanthrone-based pigment, benzimidazolone-based pigment, phthalocyanine-based pigment, quinacridone-based pigment, anthraquinone-based pigment, perylene-based pigment, perinone-based pigment, anthrapyridin-based pigment, pyranthrone-based pigment, dioxazine-based pigment, thioindigo-based pigment, isoindolinone-based pigment, quinophthalone-based pigment, and indanthrene-based pigment. Examples of the inorganic pigment may include zinc oxide, antimony white, carbon black, iron black, titanium boride, red iron oxide, Mapico yellow, red lead, cadmium yellow, zinc sulfide, lithopone, barium sulfide, cadmium selenide, calcium carbonate, barium sulfate, lead chromate, lead sulfate, barium carbonate, white lead, and alumina white. Examples of the dye may include nigrosine-based dye, azo-based dye, phthalocyanine-based dye, quinophthalone-based dye, anthraquinone-based dye, and methine-based dye. Examples of the carbon material may include carbon black. Examples of the metal material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a polymer compound to which a functional group that has a light absorption range in a visible light range is introduced. The kind of such a polymer compound is not particularly limited as long as the polymer compound has the light absorption range in the visible light range in such a manner.

A content (concentration) of the electrophoretic particles 32 in the insulating liquid 31 is not particularly limited, but may be, for example, from 0.1 wt % to 10 wt %. This is because shielding (hiding) characteristics and mobility of the electrophoretic particles 32 are secured thereby. In this case, when the content of the electrophoretic particles 32 in the insulating liquid 31 is less than 0.1 wt %, the electrophoretic particles 32 may be difficult to shield the porous layer 33. On the other hand, when the content thereof is higher than 10 wt %, dispersibility of the electrophoretic particles 32 may be degraded. This may cause the electrophoretic particles 32 to be difficult to migrate, and may cause the electrophoretic particles 32 to aggregate in some cases.

Also, the electrophoretic particle 32 has arbitrary optical reflection characteristics (light reflectance). The light reflectance of the electrophoretic particle 32 is not particularly limited, but may be preferably set so that the electrophoretic particles 32 is allowed to shield the porous layer 33 at least. This is because a difference between the light reflectance of the electrophoretic particle 32 and light reflectance of the porous layer 33 is utilized to generate contrast.

A specific material for forming the electrophoretic particle 32 may be selected, for example, depending on a role assigned to the electrophoretic particle 32 for generating contrast. For example, when bright display (white display) is performed by the electrophoretic particle 32, the material thereof may be, for example, a metal oxide such as titanium oxide, zinc oxide, zirconium oxide, barium titanate, or potassium titanate, and may be preferably titanium oxide in particular. This is because such a material is superior in electrochemical stability, dispersibility, and the like and achieves higher reflectance. On the other hand, when dark display (black display) is performed by the electrophoretic particle 32, the material thereof may be, for example, a carbon material, a metal oxide, or the like. Examples of the carbon material may include carbon black. Examples of the metal oxide may include copper-chromium oxide, copper-manganese oxide, copper-iron-manganese oxide, copper-chromium-manganese oxide, and copper-iron-chromium oxide. In particular, the carbon material may be preferable because superior chemical stability, superior mobility, and superior light absorbability are achieved thereby.

When bright display is performed by the electrophoretic particle 32, a color of the electrophoretic particle 32 that is visually perceived from the outside is not particularly limited as long as contrast is generated; however, a color close to white may be preferable in particular, and white may be more preferable. On the other hand, when dark display is performed by the electrophoretic particle 32, the color of the electrophoretic particle 32 that is visually perceived from the outside is not particularly limited as long as contrast is generated; however, a color close to black may be preferable in particular, and black may be more preferable. This is because contrast is increased in both of the cases.

It is to be noted that the electrophoretic particle 32 may be preferably easy to be dispersed and charged for a long time in the insulating liquid 31 and difficult to be absorbed by the porous layer 33. For this reason, in order to disperse the electrophoretic particles 32 by electrostatic repulsion, a dispersant (or a charge modifier) may be used, a surface process may be performed, or both may be performed together.

Examples of the dispersant may include Solsperese series available from The Lubrizol Corporation, BYK series or Anti-Terra series available from BYK-Chemie, and Span series available from ICI Americas Inc.

Examples of the surface process may include a rosin process, a surfactant process, a pigment derivative process, a coupling agent process, a graft polymerization process, and a microencapsulation process. In particular, the graft polymerization process, the microencapsulation process, or a combination thereof may be preferable because long-term dispersion stability, etc. are achieved thereby.

A material used for the surface process may be, for example, a material (an absorptive material) that includes a functional group absorbable by the surface of the electrophoretic particle 32, and a polymerizable functional group. The kind of the absorbable functional group is determined depending on the material forming the electrophoretic particle 32. To give an example, the kind of the absorbable functional group may be an aniline derivative such as 4-vinylaniline for the carbon material such as carbon black, and may be an organosilane derivative such as a methacrylate3-(trimethoxysilyl)propyl for the metal oxide. Examples of the polymerizable functional group may include a vinyl group, an acryl group, and a methacryl group.

Alternatively, the material used for the surface process may be a material (a graft material) that is graftable to the surface of the electrophoretic particle 32 to which a polymerizable function group is introduced. The graft material may preferably include a polymerizable functional group, and a dispersion functional group that is dispersible in the insulating liquid 31 and is allowed to retain dispersibility due to steric effects. The kind of the polymerizable functional group may be similar to that described for the absorptive material. The dispersion functional group may be, for example, a branched alkyl group when the insulating liquid 31 is paraffin. For example, a polymerization initiator such as azobisisobutyronitrile (AIBN) may be used in order to polymerize or graft the graft material.

For reference, the details of the method of dispersing the electrophoretic particles 32 in the insulating liquid 31 in a manner described above is in a book, for example, "Dispersion Technique of Ultrafine Particles and Evaluation Thereof—Surface Treatment/Fine Grinding, and Dispersion Stabilization in Air, Liquid, and Polymer (Science & Technology Co., Ltd.)", etc.

Figure 3:
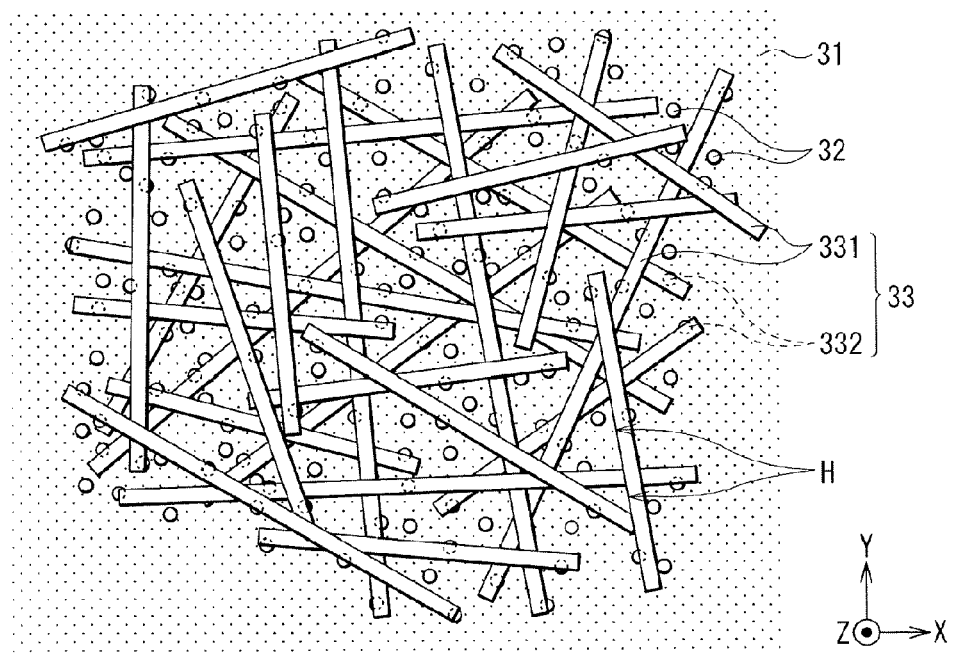
FIG. 3 is a schematic diagram illustrating a configuration example of an electrophoretic device.

As illustrated in FIG. 3, the porous layer 33 may be configured, for example, of a three-dimensional structure (a non-woven-fabric-like irregular network structure) formed of a fibrous structure 331. The fibrous layer 33 may have, at positions where no fibrous structure 331 is present, a plurality of gaps (fine pores H) that allow the electrophoretic particle 32 to pass therethrough. It is to be noted that, illustration of the porous layer 33 is simplified in FIG. 1.

The fibrous structure 331 may include one or more non-migrating particles 332. The non-migrating particle 332 is held by the fibrous structure 331. In the porous layer 33 that is a three-dimensional structure, a single fibrous structure 331 may be randomly tangled, or a plurality of fibrous structures 331 may be collected to be randomly overlapped with each other. Alternatively, both may exit together. When a plurality of fibrous structures 331 are provided, each of the fibrous structures 331 may preferably hold one or more non-migrating particles 332. It is to be noted that FIG. 3 illustrates a case where the porous layer 33 is formed of a plurality of fibrous structures 331.

One reason why the porous layer 33 is configured of the three-dimensional structure is because the irregular three-dimensional structure allows outside light to be easily diffused (multiply scattered), and the light reflectance of the porous layer 33 is therefore increased and the porous layer 33 is allowed to be thinner to achieve such high reflectance. This increases contrast and decreases energy necessary for causing the electrophoretic particle 32 to move. Another reason is because the fine pores H are increased in average pore size and in the number thereof, and the electrophoretic particle 32 is therefore allowed to pass through the fine pores H more easily. This decreases the time and energy necessary for causing the electrophoretic particle 32 to move.

One reason why the non-migrating particle 332 is included in the fibrous structure 331 is because this allows outside light to be more easily diffused, and the light reflectance of the porous layer 33 is therefore increased more. This further increases contrast.

The fibrous structure 331 may be a fibrous material that has a length sufficiently large with respect to a fiber size (a diameter). The fibrous structure 331 may include, for example, one or more of polymer materials, inorganic materials, and the like, and may include other materials. Examples of the polymer material may include nylon, polylactic acid, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers thereof. Examples of the inorganic material may include titanium oxide. In particular, the polymer material may be preferable as the material forming the fibrous structure 331. This is because the polymer material has lower (is chemically stable in) reactivity (such as light reactivity), and unintentional decomposition reaction of the fibrous structure 331 is therefore suppressed. It is to be noted that a surface of the fibrous structure 331 may be preferably covered with an arbitrary protective layer when the fibrous structure 331 is formed of a material having high reactivity.

A shape (an appearance) of the fibrous structure 331 is not particularly limited as long as the fibrous structure 331 has a fibrous shape that has a length sufficiently large with respect to the fiber size as described above. Specifically, the fibrous structure 331 may be linear, curled, or bent in the mid-course. Further, the fibrous structure 331 is not limited to extend in one direction, and may be branched into one or more directions in the mid-course. A method of forming the fibrous structure 331 is not particularly limited, but may be preferably, for example, a phase separation method, a phase inversion method, an electrostatic (electric field) spinning method, a melt spinning method, a wet spinning method, a dry spinning method, a gel spinning method, a sol gel method, a spray coating method, or the like. This is because a fibrous material that has a length sufficiently large with respect to a fiber size thereof is easily and stably formed thereby.

The average fiber size of the fibrous structure 331 is not particularly limited, but may be preferably as small as possible because light is made easier to be diffused and the average pore size of the fine pores H is made larger thereby. However, it is necessary to determine the average fiber size so that the fibrous structure 331 is capable of holding the non-migrating particle 332. For this reason, the average fiber size of the fibrous structure 331 may be preferably not more than 10 µm. It is to be noted that a lower limit of the average fiber size is not particularly limited, but may be 1 µm or may be smaller than 0.1 µm, for example. The average fiber size may be measured, for example, by microscopic observation with the use of a scanning electron microscope (SEM), etc. It is to be noted that the fibrous structure 331 may have an arbitrary average length.

The average pore size of the fine pores H is not particularly limited, but may be preferably as large as possible, in particular, because the electrophoretic particle 32 is thereby allowed to pass through the fine pores H more easily. For this reason, the average pore size of the fine pores H may be preferably from 0.1 µm to 10 µm.

A thickness of the porous layer 33 is not particularly limited, but may be, for example, from 5 µm to 100 µm. This is because such a thickness increases the shielding characteristics of the porous layer 33 and allows the electrophoretic particle 32 to pass through the fine pores H more easily.

In particular, the fibrous structure 331 may be preferably a nanofiber. This is because the three-dimensional structure is thereby made more complicated to easily diffuse outside light, which further increases the light reflectance of the porous layer 33. This is also because a ratio of a volume of the fine pores H occupying a unit volume of the porous layer 33 is thereby increased, which allows the electrophoretic particle 32 to pass through the fine pores H more easily. Consequently, contrast is further increased, and the energy necessary for causing the electrophoretic particle 32 to move is further reduced. A nanofiber is a fibrous material that has a fiber size from 0.001µ to 0.1 µm, and has a length that is hundred times or more of the fiber size. The fibrous structure 331 configured of a nanofiber may be preferably formed by electrostatic spinning method with the use of the polymer material because the fibrous structure 331 having a small fiber size is thereby formed easily and stably.

The fibrous structure 331 may preferably have optical reflection characteristics different from those of the electrophoretic particle 32. Specifically, the light reflectance of the fibrous structure 331 is not particularly limited, but may be preferably set so that at least the porous layer 33 as a whole is allowed to shield the electrophoretic particles 32. This is for utilizing the difference between the light reflectance of the electrophoretic particle 32 and the light reflectance of the porous layer 33 to generate contrast as described above. Accordingly, the fibrous structure 331 may more preferably have light reflection characteristics than have light transmission characteristics (be colorless and transparent) in the insulating liquid 31. However, when the light reflectance of the fibrous structure 331 have little influence on the light reflectance of the porous layer 33 as a whole, and the light reflectance of the porous layer 33 as a whole is substantially determined by the light reflectance of the non-migrating particle 332, the light reflectance of the fibrous structure 331 may be arbitrarily set.

The non-migrating particle 332 is fixed to the fibrous structure 331 and does not electrically migrate. A material for forming the non-migrating particle 332 may be, for example, similar to the material for forming the electrophoretic particle 32, and may be selected depending on a role assigned to the non-migrating particle 332 as described above.

It is to be noted that the non-migrating particle 332 may be partially exposed from the fibrous structure 331, and may be embedded in the fibrous structure 331 as long as the non-migrating particle 332 is held by the fibrous structure 331.

The non-migrating particle 332 may have optical reflection characteristics different from those of the electrophoretic particle 32. The light reflectance of the non-migrating particle 332 is not particularly limited, but may be preferably set so that at least the porous layer 33 as a whole is allowed to shield the electrophoretic particles 32. This is for utilizing the difference between the light reflectance of the electrophoretic particle 32 and the light reflectance of the porous layer 33 to generate contrast as described above.

Here, a specific material for forming the non-migrating particle 332 may be selected, for example, depending on a role assigned to the non-migrating particle 332 in order to generate contrast. Specifically, when bright display is performed by the non-migrating particle 332, the material for forming the non-migrating particle 332 may be similar to the materials of the electrophoretic particle 32 selected for bright display. On the other hand, when dark display is performed by the non-migrating particle 332, the material for forming the non-migrating particle 332 may be similar to the material of the electrophoretic particle 32 selected for dark display. In particular, the material selected for the case where bright display is performed by the non-migrating particle 332 may be preferably metal oxide, and more preferably titanium oxide, because such a material is superior in electrochemical stability, fixability, etc. and achieves higher reflectance. The material for forming the non-migrating particle 332 may be the same as the material for forming the electrophoretic particle 32 or may be different therefrom as long as contrast is allowed to be generated thereby.

It is to be noted that a color visually perceived when bright display or dark display is performed by the non-migrating particle 332 may be similar to the above-described color in which the electrophoretic particle 32 is visually perceived.

An example of a procedure of forming the porous layer 33 may be as follows. First, the material (for example, the polymer material or the like) for forming the fibrous structure 331 may be dispersed or dissolved in an organic solvent to prepare spinning solution. Subsequently, the non-migrating particles 332 may be added to the spinning solution, which may be sufficiently stirred to disperse the non-migrating particles 332 in the spinning solution. Finally, spinning is performed by an electrostatic spinning method with the use of the spinning solution. Thus, the non-migrating particles 332 are held by the fibrous structure 331, and the porous layer 33 is formed accordingly.

The spacer 40 may include, for example, an insulating material such as a polymer material. However, a configuration of the spacer 40 is not particularly limited, and may be a sealant in which microparticles are mixed.

A shape of the spacer 40 is not particularly limited, but may be preferably a shape that does not prevent the movement of the electrophoretic particles 32 between the pixel electrodes 15 and the counter electrode 34 and allows the electrophoretic particles 32 to be uniformly distributed. For example, the spacer 40 may have a lattice-like shape. Also, a thickness of the spacer 40 is not particularly limited. However, in particular, the thickness of the spacer 40 may be preferably as thin as possible in order to reduce consumed power, and may be, for example, from 10 μm to 100 μm. It is to be noted that FIG. 1 illustrates the configuration of the spacer 40 in a simplified manner.

[Preferable Display Method of Electrophoretic Device]

In this electrophoretic device 30a, the difference between the light reflectance of the electrophoretic particle 32 and the light reflectance of the porous layer 33 is utilized to generate contrast as described above. In this case, bright display may be performed by the electrophoretic particle 32 while dark display is performed by the porous layer 33, or vice versa. Such a difference in role is determined by a magnitude relationship between the light reflectance of the electrophoretic particle 32 and the light reflectance of the porous layer 33. Specifically, light reflectance of the component for bright display is set to be higher than light reflectance of the component for dark display.

In particular, the light reflectance of the porous layer 33 is higher than the light reflectance of the photoelectric particle 32. For this reason, it may be preferable that dark display is performed by the electrophoretic particle 32 and bright display is performed by the porous layer 33. Accordingly, in a case where the light reflectance of the porous layer 33 is determined depending on the light reflectance of the non-migrating particle 332, the light reflectance of the non-migrating particle 332 may be preferably higher than the light reflectance of the electrophoretic particle 32. This is because the light reflectance in bright display is remarkably increased by utilizing the diffusion of outside light by the porous layer 33, and contrast is also remarkably increased accordingly.

It is to be noted that a peripheral circuit (which is not illustrated) for driving the electrophoretic device 30a for each of the pixels (for applying a drive voltage between the pixel electrode 15 and the counter electrode 34) may be provided in the drive substrate 10. The peripheral circuit may include, for example, a voltage control driver for forming an active-matrix drive circuit, a power source, a memory, and/or the like, and may be allowed to apply a drive voltage corresponding to an image signal to one or more selective pixels.

[Manufacturing Method (Color Filter Mounting Method)]

In the display unit 1 as described above, the color filter may be directly drawn on a monochrome display member (a display member 10A) in a manufacturing process. Alternatively, the color filter may be fabricated as another module separately from the monochrome display member, and the color filter and the monochrome display member may be attached to each other by the bonding layer 23. Here, description is provided referring, as an example, to a case where the color filter and the monochrome display member are fabricated as separated modules. It is to be noted that the display member 10A referred herein corresponds to a lamination including the drive substrate 10 (the support base 11, the TFT layer 12 (the TFT 12a and the protective layer 13), and the pixel electrode 15), the adhesive layer 14, the display layer 30, the counter electrode 34, and the transparent base 35, out of the above-described laminated structure of the display unit 1. FIGS. 4 to 8 illustrate in order steps of forming the color filter 22 and steps of attaching this color filter 22 to the display member 10A.

Figure 4A:
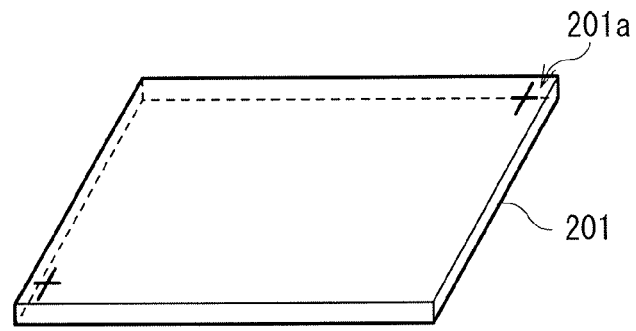
FIG. 4A is a perspective view illustrating a step of a method of manufacturing the display unit illustrated in FIG. 1.

First, as illustrated in FIG. 4A, a glass plate 201 that has the planar area larger than that of the display layer 30 (pixel area) is prepared, and an alignment mark 201a is formed at a predetermined position in this glass plate 201. The alignment mark 201a may be formed, for example, with the use of a photoresist (a so-called black resist) including a black pigment or a black dye. It is to be noted that this glass plate 201 is a support member for attaching the color filter 22 to the display member 10A and is peeled off after the attachment, which is described later in detail.

Figure 4B:
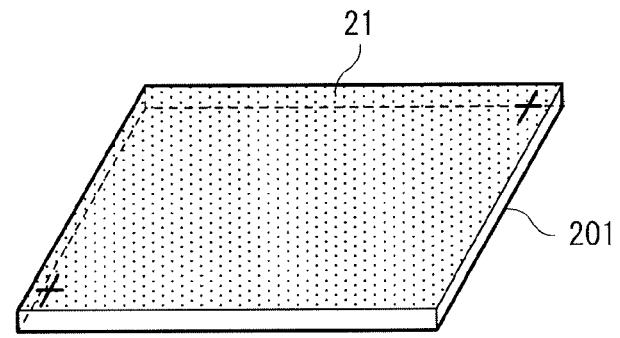
FIG. 4B is a perspective view illustrating a step following FIG. 4A.

Subsequently, as illustrated in FIG. 4B, the transparent base 21 is attached to a surface (a surface on which the alignment mark 201a is formed) of the glass plate 201, thereby tentatively fixing the transparent base 21 to the glass plate 201. At this time, specifically, for example, an adhesive material of an UV-foamed type or of a thermally-foamed type may be applied onto the glass plate 201, for example, with the use of a spin coater, a bar coater, a gravure printing machine, a slit coater, or the like, and the film-like transparent base 21 is attached thereto by a roller. Alternatively, a film-like adhesive sheet of a UV-foamed type or of a thermally-foamed type may be attached onto the glass plate 201 by a roller, and the transparent base 21 may be attached thereto by a roller.

Figure 4C:
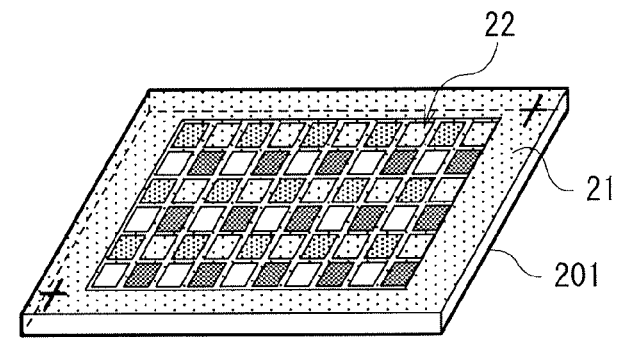
FIG. 4C is a perspective view illustrating a step following FIG. 4B.

Subsequently, as illustrated in FIG. 4C, the color filter 22 is formed on the transparent base 21. Specifically, for example, the filter layers of the respective colors of R, G, and B may be patterned on a selective region (a region facing the display layer 30) on the transparent base 21. It is to be noted that, at this time, when adopting a four-pixel configuration of R, G, B, and W, the filter layers may be formed only on the pixel regions of R, G, and B, and no filter layer may be formed on the W pixel region.

Figure 5A:
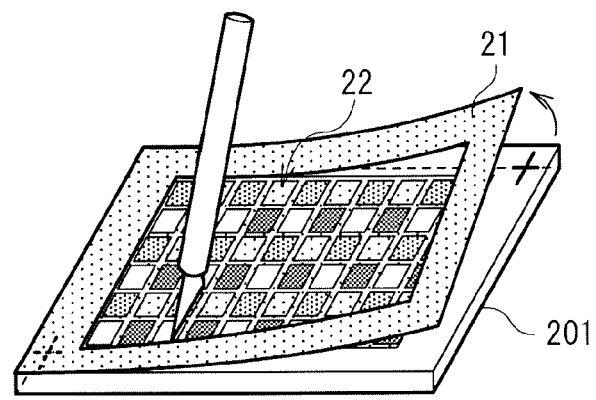
FIG. 5A is a perspective view illustrating a step following FIG. 4C.

Subsequently, as illustrated in FIG. 5A, a portion (an outer portion), of the transparent base 21, on which the color filter 22 is not formed is cut off to be removed. This is for allowing the transparent base 21 not to spread out into an electrode area of the TFT after attaching the color filter 22 to the display member 10A in a step described later.

Figure 5B:
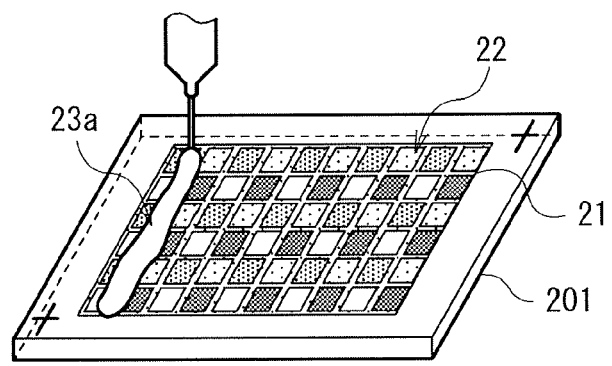
FIG. 5B is a perspective view illustrating a step following FIG. 5A.

Subsequently, as illustrated in FIG. 5B, for example, a UV-curable bonding agent 23a may be applied onto the color filter 22.

Figure 6:
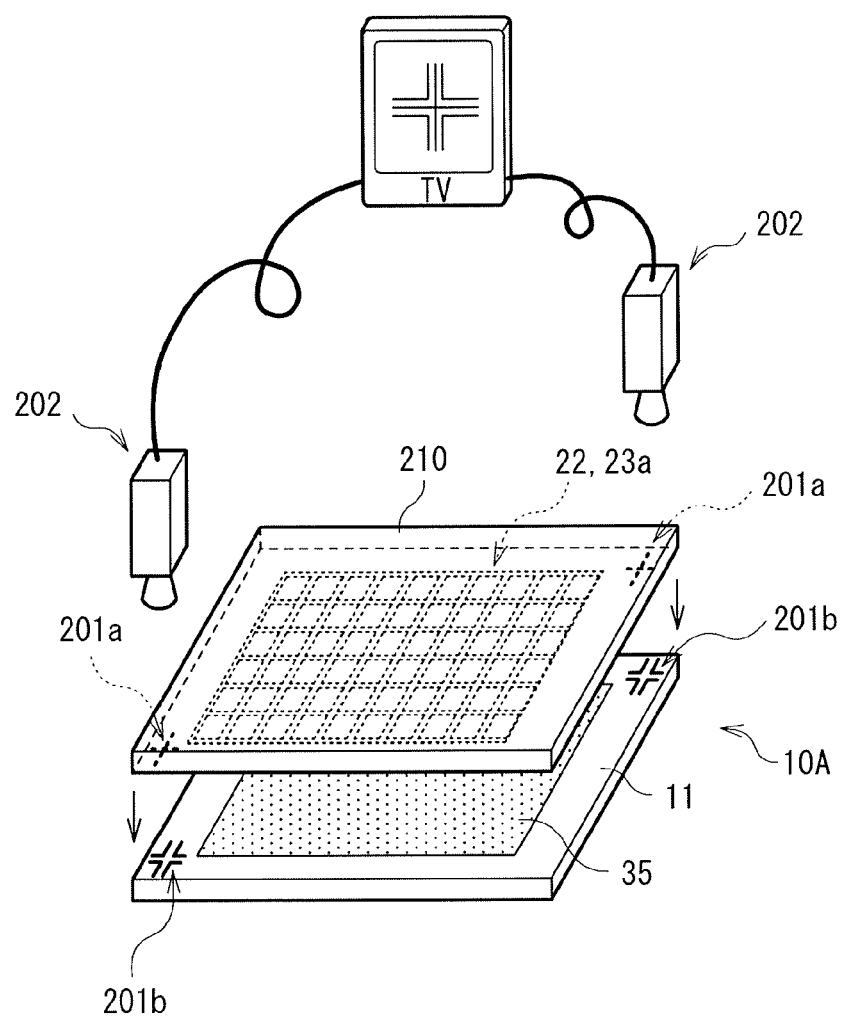
FIG. 6 is a perspective view illustrating a step following FIG. 5B.

Subsequently, the color filter 22 is attached to the display member 10A. Specifically, first, as illustrated in FIG. 6, the color filter 22 supported by the glass plate 201 is arranged to face a top surface (the transparent base 35) of the display member 10A with the bonding agent 23a in between. It is to be noted that an alignment mark 201b to be engaged with the forgoing alignment mark 201a is formed in advance on the drive substrate 10 (in detail, the support base 11) of the display member 10A. Thereafter, each of the alignment marks 201a and 201b is aligned while being monitored with a camera 202, and the color filter 22 is overlapped with the display member 10A, which is pressed.

Figure 7A:
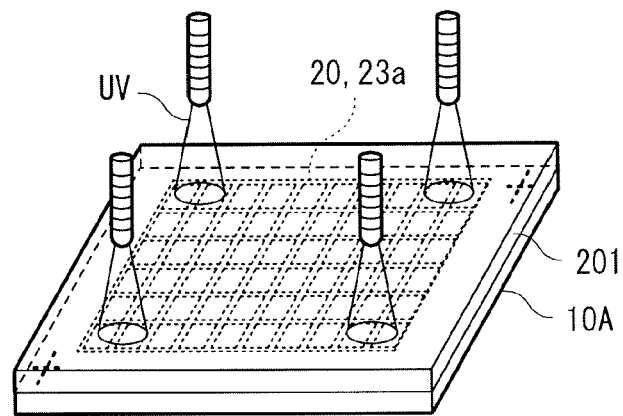
FIG. 7A is a perspective view illustrating a step following FIG. 6.

Subsequently, as illustrated in FIG. 7A, the color filter 22 is tentatively fixed onto the display member 10A. Specifically, ultraviolet ray UV is applied only onto a selective region (here, onto four corners of the color filter 22) of the display member 10A and the color filter 22 that are overlapped with each other with the bonding agent 23a in between, and the bonding agent 23a in the applied portion is cured.

Figure 7B:
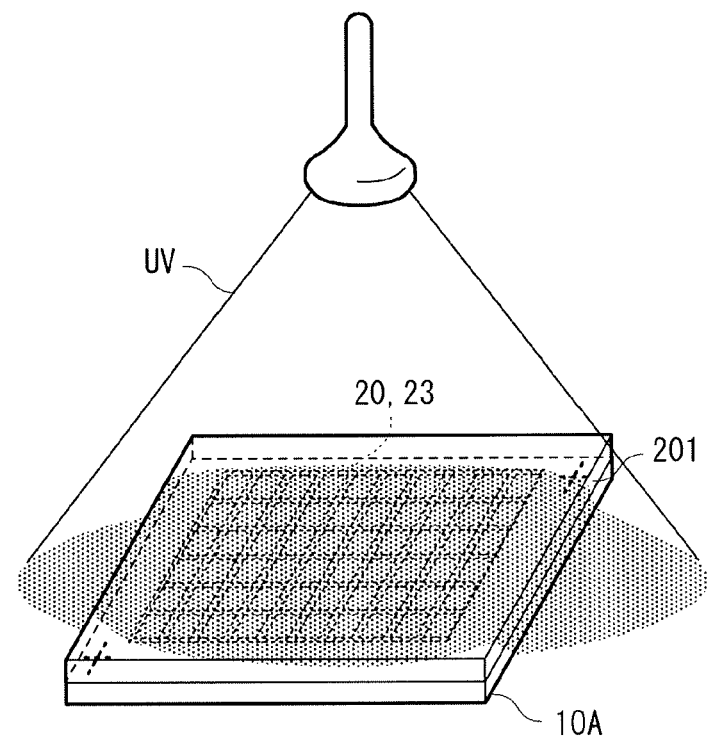
FIG. 7B is a perspective view illustrating a step following FIG. 7A.

Subsequently, as illustrated in FIG. 7B, ultraviolet ray UV is applied onto the entire surface of the display member 10A and the color filter 22 that are tentatively fixed to cure the entire region of the bonding agent 23a. Thus, the color filter 22 is attached to the display member 10A with the bonding layer 23 in between.

Figure 8:
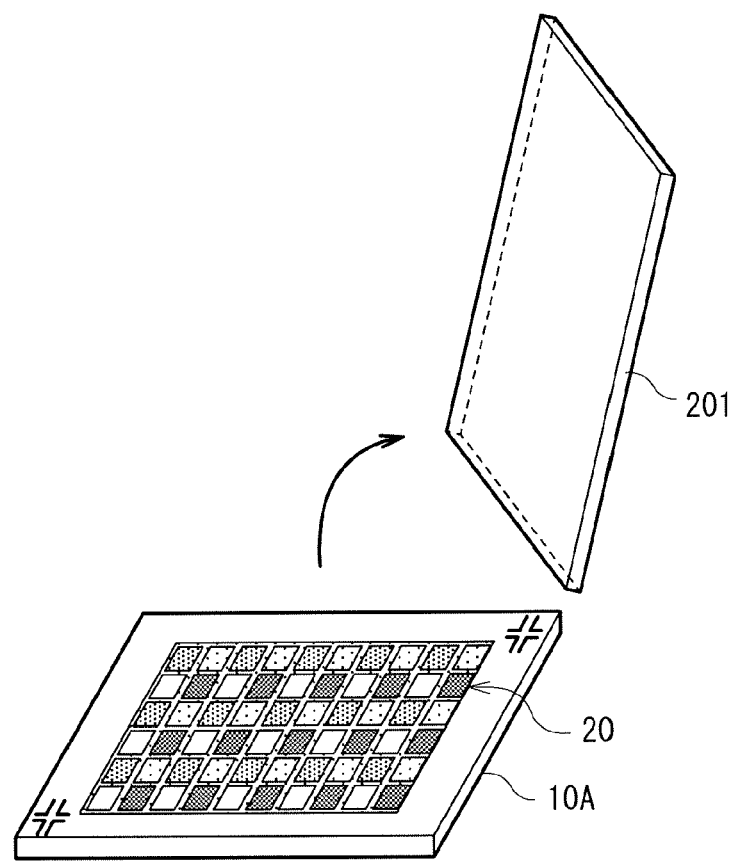
FIG. 8 is a perspective view illustrating a step following FIG. 7B.

Lastly, as illustrated in FIG. 8, the glass plate 201 is peeled off. The display unit 1 illustrated in FIG. 1 is thus completed.

[Functions and Effects]
[Color Display Operation]

Figure 9:
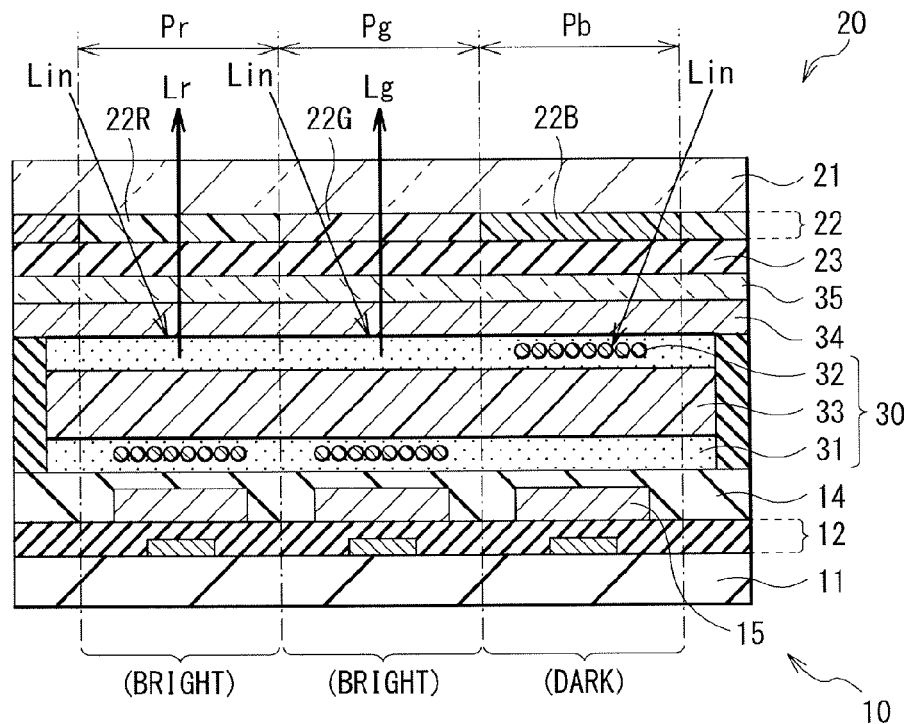
FIG. 9 is a schematic diagram for explaining a display operation of the display unit illustrated in FIG. 1.
Figure 10:
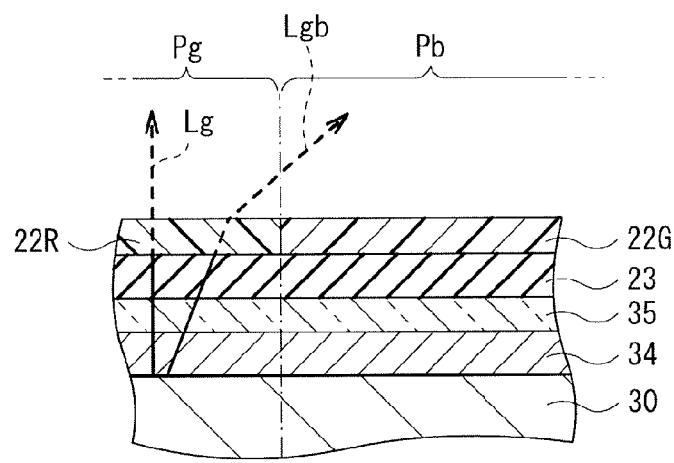
FIG. 10 is a schematic diagram for explaining leakage of display light into an adjacent pixel.

Next, an operation of the display unit 1 is described. FIGS. 9 to 11 are for explaining the operation of the display unit 1. Here, for example, a case where dark display (black display) is performed by the electrophoretic particle 32, and bright display (white display) is performed by the porous layer 33 is referred to as an example.

In the display unit 1 of the present embodiment, the plurality of pixels each including the electrophoretic device 30a are arranged on the drive substrate 10, for example, in a matrix (in rows by columns). A color filter of one color in the color filter 22 is provided to face each of the plurality of pixels. In the description below, a region facing the red filter layer 22R is referred to as an R pixel (a pixel Pr), a region facing the green filter layer 22G is referred to as a G pixel (a pixel Pg), and a region facing the blue filter layer 22B is referred to as a B pixel (a pixel Pb). It is to be noted that "pixel" is simply used for description in a case where it is not particularly necessary to distinguish the pixels Pr, Pg, and Pb from one another (to distinguish R, G, and B from one another).

First, description is provided of a case, as an initial state (a state in which no voltage is applied to the entire region of the display layer 30), where the electrophoretic particles 32 exist locally on the pixel electrode 15 side or on the counter electrode 34 side in all of the pixels. Here, the electrophoretic particles 32 exist locally on the pixel electrode 15 side (in a region between the porous film 33 and the pixel electrode 15), and the electrophoretic particles 32 are shielded by the porous layer 33 in the display layer 30. Accordingly, the light reflectance of the porous layer 33 is more dominant than the light reflectance of the electrophoretic particle 32 in the display layer 30 even when outside light enters, which achieves bright display in the display layer 30 as a whole. Moreover, no image is displayed in such a state because contrast between brightness and darkness is not generated between pixels.

Subsequently, upon application of a predetermined drive voltage to the selected pixel based on an image signal, an electric filed is generated in the display layer 30, and the electrophoretic particles 32 move from the pixel electrode 15 side toward the counter electrode 34. As a result, layer states of the electrophoretic particles 32 and the porous layer 33 in the insulating liquid are varied in each of the pixels, which varies light reflectance therein. In other words, contrast is generated based on a difference in reflective light amount (exited light amount) between pixels, and an image is formed thereby. It is to be noted that, at this time, the movement amount of the electrophoretic particle 32 is controlled by controlling magnitude of the drive voltage to be applied to each of the pixels, application time thereof, etc. Thus, it is possible to express gradation.

Outside light (white light) that has been reflected by the porous layer 33 exits from the display layer 30, and then passes through the filter having a corresponding color in the color filter 22 (one of the red filter layer 22R, the green filter layer 22G, and the blue filter layer 22B). Light having a particular wavelength is thus extracted to the outside via the display substrate 20 in each of the pixels. For example, in the pixel Pr, the light exited from the display layer 30 passes through the red filter layer 22R to be extracted to the outside as red light. Similarly, in the pixel Pg, the light exited from the display layer 30 passes through the green filter layer 22G to be extracted to the outside as green light, and in the pixel Pb, the light exited from the display layer 30 passes through the blue filter layer 22B to be extracted to the outside as blue light. Also, although not illustrated herein, when the white pixel (the pixel Pw) is provided, no color filter exists therein, and the light exited from the display layer 30 (the light reflected by the porous layer 33) itself is therefore extracted to the outside as white light.

An example thereof is schematically illustrated in FIG. 9. In the example illustrated in FIG. 9, the display layer 30 is driven to be in a bright display state in the pixels Pr and Pg, and the pixel Pb is driven to be in a dark display state. Specifically, in the pixel Pg, the electrophoretic particles 32 that exist locally on the pixel electrode 15 side are shielded by the porous layer 33. Incident light (outside light) Lin is therefore reflected by the porous layer 33, and this reflected light passes through the green filter layer 22G, which results in extraction of green light Lg. The same is applicable to the pixel Pr. Light reflected by the porous layer 33 passes through the red filter layer 22R, which results in extraction of red light Lr. On the other hand, in the pixel Pb, the electrophoretic particles 32 exist locally on the counter electrode 34 side. The incident light Lin is therefore reflected by the electrophoretic particles 32 at reflectance lower than that of the porous layer 33, or absorbed by the electrophoretic particles 32. Consequently, little of the incident light Lin is extracted onto the display substrate 20. It is to be noted that, in this example, there is described the case where the electrophoretic particles 32 exist locally either on the pixel electrode 15 side or on the counter electrode 34 side in each of the pixels, for the sake of simplification. However, in a case of expressing gradation between white and black, or the like, the electrophoretic particles 32 may exist both on the pixel electrode 15 side and the counter electrode 34 side, or distribution of the electrophoretic particles 32 may be imbalanced.

When the display unit 1 in such an operation state is observed from the display substrate 20 side, pixels in a bright display state and pixels in a dark display state coexist, and synthesized light of light having the respective colors derived from the pixels Pr, Pg, and Pb is visually perceived. Consequently, in the display unit 1 as a whole, contrast is generated utilizing a difference in display color for each of the pixels resulting from the synthesized light derived from the pixels Pr, Pg, and Pb (sub-pixels), and color tone is determined by additive color mixture. Thus, display color is switched in each of the pixels configured of the pixels Pr, Pg, and Pb to perform color display.

[Concerning Degradation in Gamut and Dependency of Chromaticity on Viewing Angle]

As described above, in the display unit 1, the light reflectance of the display layer 30 is controlled for each of the pixels to utilize contrast of the reflected light to form an image (a monochrome image), and the formed image (light) is displayed through the color filter 22, thereby achieving color image display.

However, when the electrophoretic device 30a is used in the display layer 30, for example, the following phenomenon occurs as a result of utilization of the reflected light as described above. Specifically, light reflection in the porous layer 33 is diffuse reflection, which causes part of the reflected light diffused isotropically to leak into a display region of the adjacent pixel. For example, as illustrated in FIG. 10, in a case bright display is performed in the pixel Pg and dark display is performed in the pixel Pb where the pixels Pg and Pb are adjacent to each other, light (green light Lgb), out of the light exited from the display layer 30 of the pixel Pg, that is extracted in a direction (an arbitrary viewing angle) inclined by a predetermined angle from a front direction (a direction perpendicular to the display surface and having a viewing angle of 0°) leaks into the adjacent pixel Pb. Such leakage of light into a pixel in which dark display is performed may cause degradation in gamut, or cause variation in chromaticity in accordance with the variation in viewing angle.

Figure 11A:
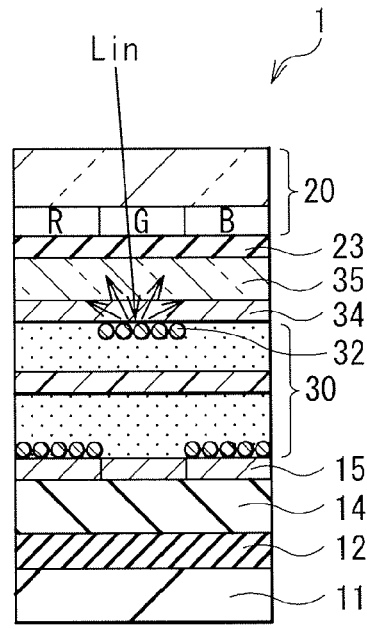
FIG. 11A is a schematic diagram for explaining a function of the display unit illustrated in FIG. 1.
Figure 11B:
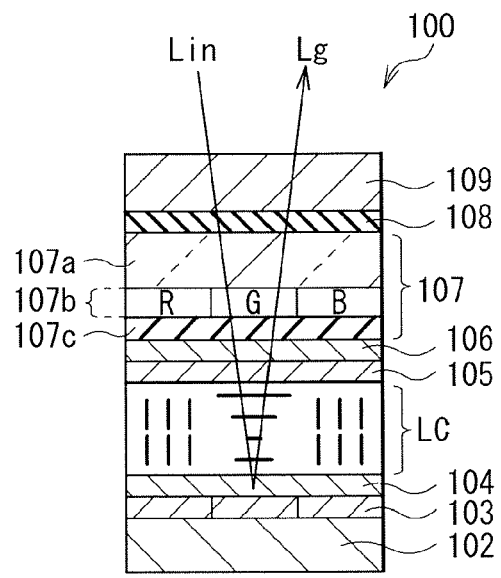
FIG. 11B is a schematic diagram for explaining a function of a comparative example (a liquid crystal display unit).

Here, the degradation in gamut resulting from light reflection or dependency of chromaticity on viewing angle as described above may be also caused in a so-called reflective liquid crystal display. However, the reflective liquid crystal display is different from the case of the electronic paper display for the following reasons. FIG. 11A schematically illustrates a cross-sectional configuration (an overall configuration) of the display unit 1 of the present embodiment, and FIG. 11B schematically illustrates a cross-sectional configuration of a reflective liquid crystal display (a display unit 100). The display unit 100 includes, in order on a support base 102, a pixel electrode (a reflective electrode) 103, an alignment film 104, a liquid crystal layer LC, an alighment film 105, a counter electrode 106, and a color filter layer 107. The color filter layer 107 is configured of a transparent base 107a, and a color filter 107b having filters of the respective colors of R, G, and B formed on a surface of the transparent base 107a. The color filter 107b is covered with an overcoat layer 107c. Also, a polarization plate 109 is attached onto the color filter layer 107 with a bonding layer 108 in between.

In the display unit 100 of a comparative example, the pixel electrode 103 has light reflection characteristics and incident light Lin is therefore reflected by the pixel electrode 103. Further, a voltage is applied to the liquid crystal layer LC to control liquid crystal transmittance of the reflected light. Contrast is thus generated for each of the pixel to form an image, and light exited from each of the pixels is displayed through the color filter layer 107. This achieves color image display. In such a manner, the display unit 100 controls transmittance of the reflected light in the liquid crystal layer LC for each of the pixels. Moreover, reflection in the pixel electrode 103 is specular reflection, and not diffuse reflection. For this reason, it is possible to suppress light leaked into an adjacent pixel by adjusting a thickness of the liquid crystal layer LC or by forming a black matrix (a shielding film) between filters of the respective colors in the color filter layer 107. In addition thereto, degradation in contrast may be mentioned as a factor for causing dependency of chromaticity on viewing angle in the liquid crystal display. In detail, because liquid crystal alignment, etc. are so designed that contrast is made the maximum based on a length of an optical path upon specular reflection in the liquid crystal display, incident light from an oblique direction (or reflected light) is caused to have a length of the optical path that is deviated from a designed value, which causes deviation of polarization rotation amount from a desirable value. As a result, contrast is degraded. Difference in contrast between exiting directions of the reflected light causes dependency of chromaticity on viewing angle. In the liquid crystal display display, retardation, polarization degree, etc. are adjusted utilizing a viewing angle compensation film in order to avoid such dependency of chromaticity on viewing angle.

In contrast, in the display unit 1 of the present embodiment, the light exited from the display layer 30 is diffused isotropically, which may make it difficult to suppress leaked light by adjusting the thickness of the display layer 30. For a similar reason, it may be difficult to achieve an effect derived from a black matrix. As described above, the dependency of chromaticity on viewing angle resulting from diffuse reflection by the electrophoretic device 30a is unique to the electronic paper display. The above-described method used in the liquid crystal display is therefore difficult to be applied thereto. For this reason, it is desired to achieve a new design technique.

Accordingly, in the present embodiment, attention is paid to the distance Da between the display layer 30 and the color filter 22, and this distance Da is set to be not more than a predetermined ratio of the pixel pitch Db to thereby reduce influence of the above-described diffuse reflection on gamut and chromaticity. Specifically, the distance Da is set to be not more than 25% of the pixel pitch Db. The distance Da may be desirably set to be not more than 17% of the pixel pitch Db, more desirably not more than 10% thereof, and further more desirably not more than 9% thereof. Moreover, the distance Da may be ideally set to be not more than 7% of the pixel pitch Db. Alternatively, the distance Da may be set to be less than 12% of the pixel pitch Db.

Here, because the bonding layer 23, the transparent base 35, and the counter electrode 34 are laminated between the display layer 30 and the color filter 22 in the display unit 1, the distance Da is equal to the sum of the thicknesses of the bonding layer 23, the transparent base 35, and the counter electrode 34. In the present embodiment, the transparent base 35 out of these in particular is made thinner, thereby achieving the distance Da that satisfies the above-described condition.

As the distance Da with respect to the pixel pitch Db is decreased (as the transparent base 35 is made thinner), an amount of leakage into an adjacent pixel region caused by the diffuse reflection in the display layer 30 is reduced. Accordingly, decrease in the distance Da (reduction in thickness of the transparent base 35) allows degradation in gamut and dependency of chromaticity on viewing angle to be suppressed.

In particular, in the present embodiment, an upper limit value (25%, 17%, 10%, 9%, 7%, or 12% of the pixel pitch Db) of such a distance Da is defined, which effectively suppresses degradation in gamut and dependency of chromaticity on viewing angle. A basis for setting the upper limit is described below.

[Basis of Setting Upper Limit of Distance Da]

Figure 12:
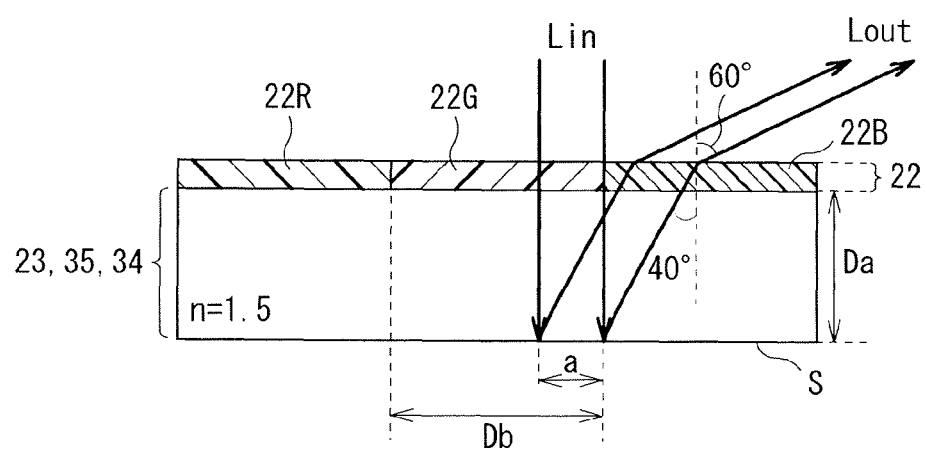
FIG. 12 is a schematic diagram for explaining the basis of an upper limit set for a distance between a color filter 22 and a display layer 30.

That is, consideration is given to the distance Da by which the influence of light leakage between adjacent pixels is made acceptable. Specifically, first, variation in chromaticity (color difference) between in the front direction and the oblique direction was determined. At this time, as illustrated in FIG. 12, the color filter 22 is disposed at a position having the distance Da from an interface S (an interface between the display layer 30 and the counter electrode 34), and a refractive index n of a portion (the bonding layer 23, the transparent base 35, and the counter electrode 34) corresponding to the distance Da was set to about 1.5. Further, the incident light Lin was made collimated light of D65. In this example, there is illustrated a state in which the light (the incident light Lin) that enters while passing through the green filter layer 22G is diffusedly reflected and part of the reflected light exits in the oblique direction to leak into the adjacent R pixel region. At this time, reflected light derived from an end region (for example, a region a) out of the pixel region easily leaks into the adjacent pixel region. For this reason, it is desirable to cause such a region a to have a width as small as possible. This region a is reduced as a ratio of the distance Da with respect to the pixel pitch Db is decreased (as the transparent base 35 is made thinner). It is therefore possible to suppress variation in chromaticity by reducing the distance Da (reducing the thickness of the transparent base 35) to reduce the leaked light. It is to be noted that the illustration in FIG. 12 is approximated as that in which diffuse reflection is performed by the interface S (the interface between the display layer 30 and the counter electrode 34). In such a laminated structure, chromaticity in the oblique direction was measured while varying the distance Da to calculate variation (a color difference $\Delta xy$) in chromaticity in the oblique direction with respect to chromaticity in the front direction for the respective distances Da.

Figures 13, 14:
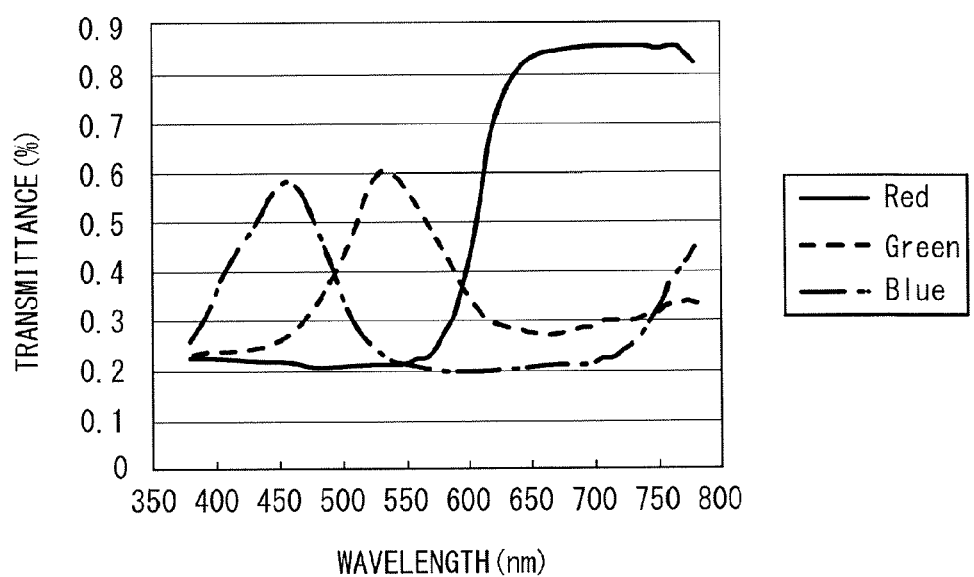
FIG. 13 is a diagram illustrating chromaticity in a case of transmission in the front direction in the color filter used in FIG. 12.
FIG. 14 is a characteristic diagram illustrating spectral transmittance distribution of the color filter used in FIG. 12.

However, as the color filter 22 (the red filter layer 22R, the green filter layer 22G, and the blue filter layer 22B), a color filter was used in which R0, G0, and B0 (Macbeth color checker) each expressed by the xy coordinate shown in FIG. 13 were obtained as the chromaticity in the front direction. FIG. 14 shows spectral transmittance distribution of that color filter 22 (spectral characteristics in one transmission). It is to be noted that a direction included in a range of a viewing angle not more than 60° (but excluding 0°) which is considered practically useful is assumed as the oblique direction. It is to be noted that exiting light Lout in a direction of viewing angle of 60° is actually based on light reflected from the interface S toward a direction of viewing angle of 40°, taking into consideration an influence of refraction.

Moreover, the color difference $\Delta xy$ corresponds to a distance between the respective coordinates of the chromaticity in the front direction and the respective coordinates of the chromaticity in the oblique direction. For example, the color difference $\Delta xy$ ($\Delta xy(r)$) for R corresponds to a distance between chromaticity R0 (0.542, 0.318) and chromaticity R1 (x1r, y1r) in the oblique direction, i.e., square root of $\{(0.542-x1r)^2+(0.318-y1r)^2\}$ here. The same is applicable to color differences $\Delta xy$ of G and B ($\Delta xy(G)$ and $\Delta xy(B)$). The color difference $\Delta xy(g)$ corresponds to a distance between chromaticity G0 (0.304, 0.495) and chromaticity G1 (x1g, y1g) in the oblique direction. The color difference $\Delta xy(b)$ corresponds to a distance between chromaticity B0 (0.188, 0.140) and chromaticity B1 (x1b, y1b) in the oblique direction.

Figure 15:
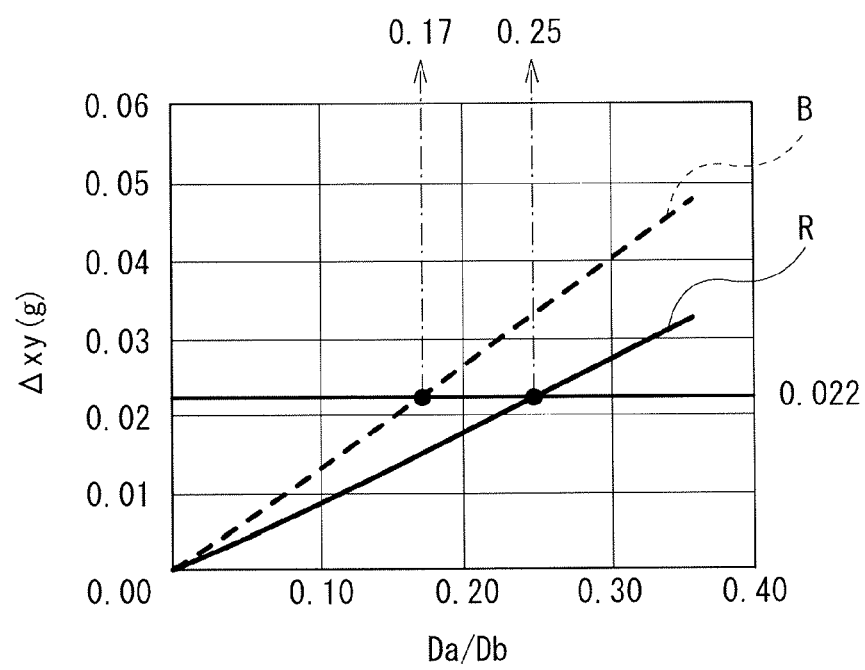
FIG. 15 is a characteristic diagram illustrating variation in chromaticity resulting from leakage of R light and B light into a G pixel.
Figure 16:
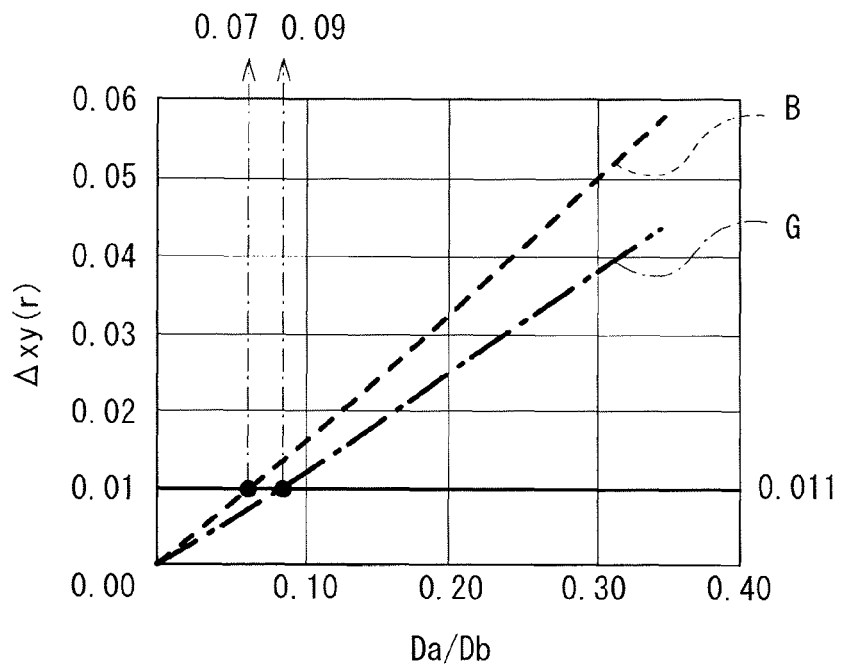
FIG. 16 is a characteristic diagram illustrating variation in chromaticity resulting from leakage of G light and B light into an R pixel.
Figure 17:
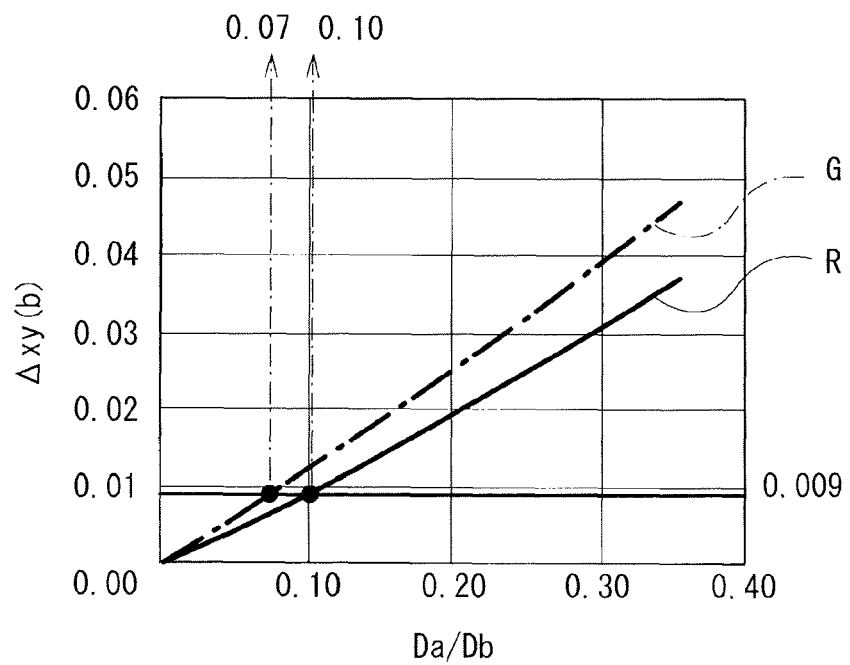
FIG. 17 is a characteristic diagram illustrating variation in chromaticity resulting from leakage of R light and G light into a B pixel.

FIGS. 15 to 17 illustrate variation, for the respective distances Da, in color differences $\Delta xy(r)$, $\Delta xy(g)$, and $\Delta xy(b)$ that are calculated as described above, respectively. Out of these, FIG. 15 illustrates a relationship between the color difference $\Delta xy(g)$ and Da/Db, and illustrates each of the case where R light leaks into the G pixel and the case where B light leaks into the G pixel. FIG. 16 illustrates a relationship between the color difference $\Delta xy(r)$ and Da/Db, and illustrates each of the case where G light leaks into the R pixel and the case where B light leaks into the R pixel. FIG. 17 illustrates a relationship between the color difference $\Delta xy(b)$ and Da/Db, and illustrates each of the case where G light leaks into the B pixel and the case where R light leaks into the B pixel. Moreover, Table 1 summarizes part of numerical values of relationships between each of the above-described color differences $\Delta xy(r)$, $\Delta xy(g)$, and $\Delta xy(b)$ and the ratio of the distance Da to the pixel pitch ((Da/Db)×100) (%).

TABLE 1

| Distance | Variation in chromaticity | | | | | |
|---|---|---|---|---|---|---|
| | $\Delta xy(g)$ | | $\Delta xy(r)$ | | $\Delta xy(b)$ | |
| A/b (%) | mixing of B | mixing of R | mixing of G | mixing of B | mixing of G | mixing of R |
| 0 | 0 | 0 | 0 | 0 | 0 | 0 |
| 6 | 0.0075 | 0.0050 | 0.0071 | 0.0090 | 0.0073 | 0.0054 |
| 12 | 0.0153 | 0.0102 | 0.0143 | 0.0182 | 0.0147 | 0.0111 |
| 18 | 0.0232 | 0.0156 | 0.0215 | 0.0277 | 0.0223 | 0.0169 |
| 24 | 0.0313 | 0.0212 | 0.0289 | 0.0374 | 0.0300 | 0.0230 |
| 30 | 0.0396 | 0.0269 | 0.0363 | 0.0473 | 0.0378 | 0.0294 |
| 36 | 0.0482 | 0.0328 | 0.0438 | 0.0575 | 0.0459 | 0.0360 |

Here, a reference literature (David L. MacAdam. "Visual Sensitivities to Color Differences in Daylight", Journal of the Optical Society of America, May, 1942, Volume 32, p 247-273) describes a difference in color (variation in chromaticity, color difference) that is visually perceivable by a human. In this reference literature, thresholds of variation in chromaticity in which the variation in chromaticity is perceived by a human as "variation in color" are determined based on experiences for various chromaticities, and the standard deviations thereof are calculated.

The present applicant has paid attention to the thresholds of chromaticity shift by which variation in color is made perceivable that is described in the above-mentioned reference literature, and has set the upper limit value of the distance Da based on such thresholds (in detail, standard deviations of the thresholds) and the results shown in FIGS. 15 to 17 and Table 1 described above. Specifically, the above-mentioned reference literature describes combinations of various chromaticities (x, y) and standard deviations ($\Delta s$) of the thresholds of chromaticity shift (see Tables I to III). Out of these, chromaticities close to chromaticities $R_0$, $G_0$, and $B_0$ in the front direction are respectively picked up, and standard deviations corresponding to the picked-up chromaticities are used to calculate the color differences $\Delta xy$ that are acceptable for the respective chromaticities of R, G, or B.

Specifically, first, attention is paid to chromaticities Rt, Gt, and Bt (Table 2) as chromaticities close to the chromaticities $R_0$, $G_0$, and $B_0$, out of chromaticities (x, y) shown in Table III in the above-mentioned reference literature, and averages (to be standard deviation averages $\sigma r$, $\sigma g$, and $\sigma b$) of the standard deviations ($\Delta s$) corresponding to the respective chromaticities Rt, Gt, and Bt are calculated. Further, variation in chromaticity taking into consideration ranges (from $+3\sigma r$ to $-3\sigma r$, from $+3\sigma g$ to $-3\sigma g$, and from $+3\sigma b$ to $-3\sigma b$) three times those of the respective standard deviation averages σr, σg, and σb is set as an acceptable color difference (color difference Δxy(t)). The color differences Δxy(t) calculated as described above are 0.011 for R, 0.022 for G, and 0.009 for B as shown in Table 2. The respective values are also shown in FIGS. 15 to 17.

TABLE 2

|  | x | y | Δxy(t) |
|---|---|---|---|
| $R_t$ | 0.527 | 0.35 | 0.011 |
| $G_t$ | 0.258 | 0.45 | 0.022 |
| $B_t$ | 0.187 | 0.118 | 0.009 |

Moreover, a reason why the ranges of three times those of the respective standard deviation averages σr, σg, and σb (hereinafter, simply referred to as 3σ) is because a human becomes aware of the variation in color with a probability of 99.9% or higher when variation in chromaticity is over this range of 3σ. Accordingly, each of the color differences Δxy(r), Δxy(g), and Δxy(b) of the respective R, G, and B is set so as to be within the color differences Δxy(t) corresponding to the range of 3σ at least. As the color difference Δxy(t) is smaller within the range from 0 to 3σ, the variation in chromaticity is made more difficult to be perceived by human eyes.

On the basis of the above-described point of view, the value of Da/Db is so set that each of the color differences Δxy(r), Δxy(g), and Δxy(b) is to be not more than the color difference Δxy(t). In other words, it is possible to set the upper limit of Da/Db that achieves values of not more than the color differences Δxy(t) based on the respective FIGS. 15 to 17.

Specifically, as illustrated in FIG. 15, for the color difference Δxy(g) of G, the color difference Δxy(t) is 0.022, and the value of Da/Db that achieves the value of 0.022 or less is 0.25 for the case of leakage of the R light (the case where the R light leaks into the G pixel from the adjacent pixel region), and is 0.17 for the case of leakage of the B light. On the other hand, as illustrated in FIG. 16, for the color difference Δxy(r) of R, the color difference Δxy(t) is 0.011, and the value of Da/Db that achieves the value of 0.011 or less is 0.09 for the case of leakage of the G light (the case where the G light leaks into the R pixel from the adjacent pixel region), and is 0.07 for the case of leakage of the B light. Moreover, as illustrated in FIG. 17, for the color difference Δxy(b) of B, the color difference Δxy(t) is 0.009, and the value of Da/Db that achieves the value of 0.009 or less is 0.10 for the case of leakage of the R light (the case where the R light leaks into the B pixel from the adjacent pixel region), and is 0.07 for the case of leakage of the B light.

Accordingly, by causing the distance Da to be not more than 25% of the pixel pitch Db, degradation in gamut is suppressed and variation in chromaticity resulting particularly from leakage of the R light into the G pixel is effectively suppressed (to an extent that the variation in chromaticity is almost unperceivable by human eyes) upon color display utilizing diffusely-reflected light.

Moreover, the distance Da may be desirably not more than 17% of the pixel pitch Db. This effectively suppresses also variation in chromaticity resulting from leakage of the B light into the G pixel in addition to that resulting from leakage of the R light into the G pixel described above. The distance Da may be more desirably not more than 10% of the pixel pitch Db. This effectively suppresses also variation in chromaticity resulting from leakage of the R light into the B pixel in addition to the variation in chromaticity with respect to the G pixel described above. The distance Da may be more desirably not more than 9% of the pixel pitch. This further suppresses effectively variation in chromaticity resulting from leakage of the G light into the R pixel. Moreover, the distance Da may be ideally not more than 7% of the pixel pitch. This further suppresses effectively the respective variations in chromaticity resulting from leakage of the B light into the R pixel and from leakage of the G light into the B pixel. In other words, by setting the distance Da to be not more than 7% thereof, visibility of color in a case where a screen is observed from the oblique direction is made equivalent to that in a case where the screen is observed from the front, in a color image using the three colors of R, G, and B (or the four colors of R, G, B, and W). Thus, degradation in gamut and dependency of chromaticity on viewing angle as described above are suppressed.

Moreover, on the other hand, an average (referred to as a standard deviation average σrgb) of standard deviations of all chromaticities shown in Table III in the above-mentioned reference literature may be determined to calculate a color difference (a color-difference average Δxy(t)a) that is allowed to accept in average a range (from +3σrgb to -3σrgb) three times that of the standard deviation average σrgb. The color-difference average Δxy(t)a thus calculated is about 0.012. That is, a human is less likely to be aware of variation in color when the average of the color differences Δxy(r), Δxy(g), and Δxy(b) of R, G, and B that are caused in the gamut represented by the chromaticities $R_0$, $G_0$, and $B_0$ in the front direction is less than the color-difference average Δxy(t)a (0.012). Further, the upper limit of the distance Da to achieve this is 12% of the pixel pitch Db.

As described above, for example, by reducing the thickness of the transparent base 35 so that the distance Da between the color filter 22 and the display layer 30 is set to be not more than 25% of the pixel pitch Db, an amount of light leaked into the adjacent pixel region resulting from diffuse reflection of light from the electrophoretic device 30a is reduced, which suppresses degradation in gamut and dependency of chromaticity on viewing angle. By causing the distance Da to be not more than 25% of the pixel pitch Db, in particular, the variation in chromaticity resulting from leakage of the R light into the G pixel is effectively suppressed.

As described above, in the present embodiment, the color filter 22 that includes the red filter layer 22R, the green filter layer 22G, and the blue filter layer 22B that face the respective pixels is provided on the display side of the display layer 30 that includes the electrophoretic device 30a. The distance Da between the color filter 22 and the display layer 30 is set to be not more than 25% of the pixel pitch Db. This suppresses degradation in gamut and dependency of chromaticity on viewing angle. As a result, it is possible to improve display quality upon color display wile utilizing the electrophoresis phenomenon.

Application Examples

Next, application examples of the display unit 1 of the above-described embodiment are described. It is to be noted that configurations of electronic apparatuses described below are mere examples, and the configurations may be therefore changed where appropriate.

Figure 18A:
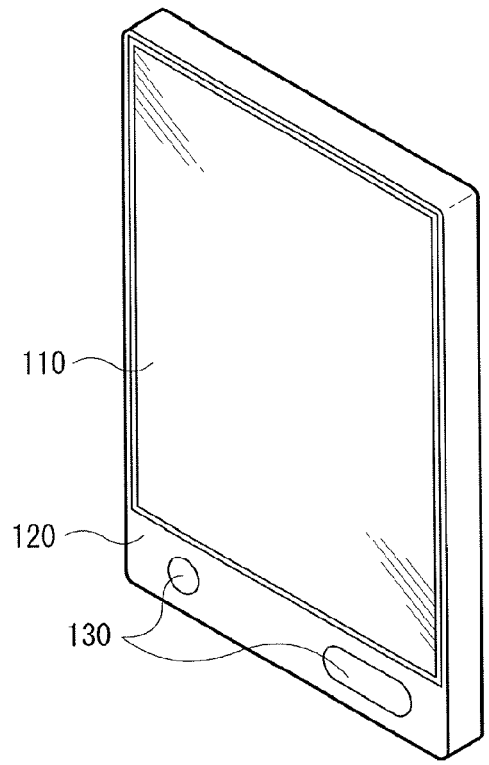
FIG. 18A is a perspective view illustrating a configuration of an electronic book that uses the display unit.
Figure 18B:
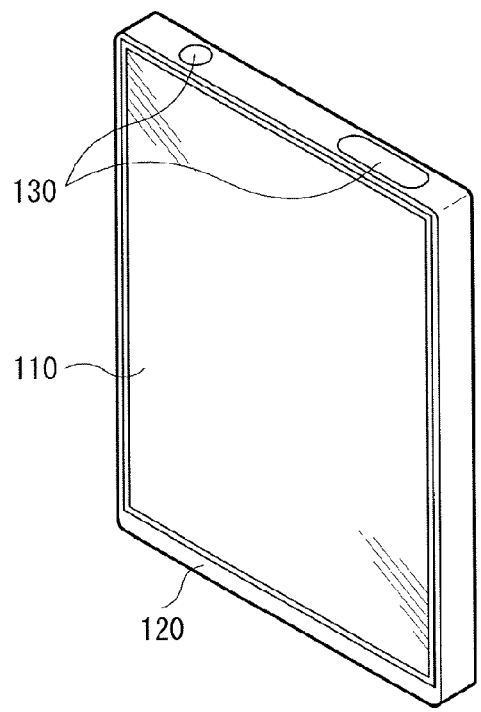
FIG. 18B is a perspective view illustrating a configuration of the electronic book that uses the display unit.

FIGS. 18A and 18B each illustrate an appearance configuration of an electronic book. The electronic book may include, for example, a display section 110 (the display unit 1), a non-display section (a housing) 120, and an operation section 130. The operation section 130 may be provided on a front face of the non-display section 120 as illustrated in FIG. 18A, or may be provided on a top face thereof as illustrated in FIG. 18B. The display unit 1 may be mounted on a PDA or the like that has a configuration similar to the configurations of the electronic books illustrated in FIGS. 18A and 18B.

Figure 19:
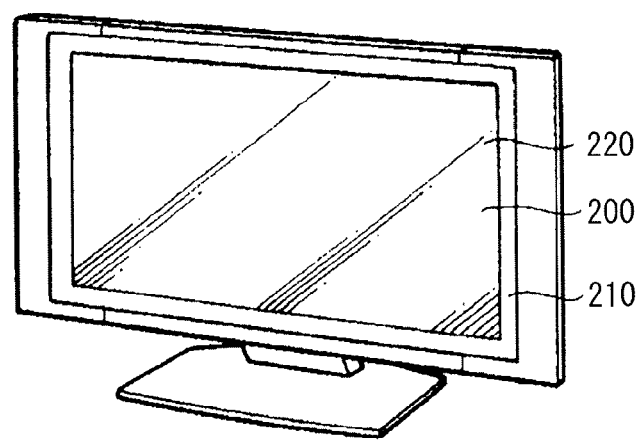
FIG. 19 is a perspective view illustrating a configuration of a television apparatus that uses the display unit.

FIG. 19 illustrates an appearance configuration of a television apparatus. The television apparatus may include, for example, a picture display screen section 200 (the display unit 1) including a front panel 210 and a filter glass 220.

Figure 20A:
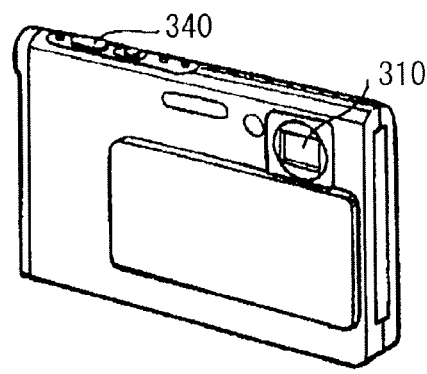
FIG. 20A is a perspective view illustrating a configuration of a digital still camera that uses the display unit.
Figure 20B:
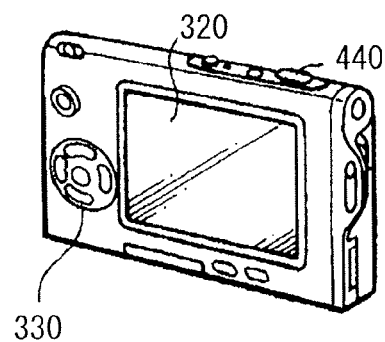
FIG. 20B is a perspective view illustrating the configuration of the digital still camera that uses the display unit.

FIGS. 20A and 20B illustrate an appearance configuration of a digital still camera. FIG. 20A illustrates a front face thereof, and FIG. 20B illustrates a back face thereof. The digital still camera may include, for example, a light emission section 310 for flash, a display section 320 (the display unit 1), a menu switch 330, and a shutter button 340.

Figure 21:
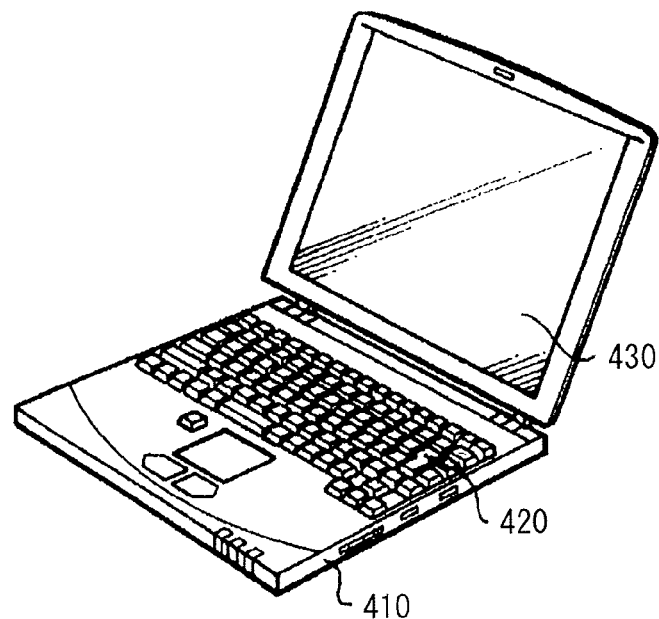
FIG. 21 is a perspective view illustrating an appearance of a personal computer that uses the display unit.

FIG. 21 illustrates an appearance configuration of a notebook personal computer. The personal computer may include, for example, a main body 410, a key board 420 for input operation of letters, etc., and a display section 430 (the display unit 1) that displays an image.

Figure 22:
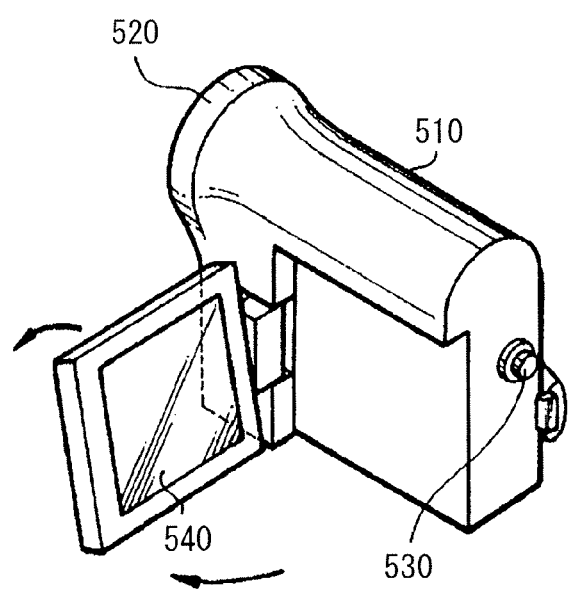
FIG. 22 is a perspective view illustrating an appearance of a video camcorder that uses the display unit.

FIG. 22 illustrates an appearance configuration of a video camcorder. The video camcorder may include, for example, a main body section 510, a lens 520, for shooting a subject, that is provided on a forward side face of the main body section 510, a start-stop switch 530 for shooting, and a display section 540 (the display unit 1).

Figure 23:
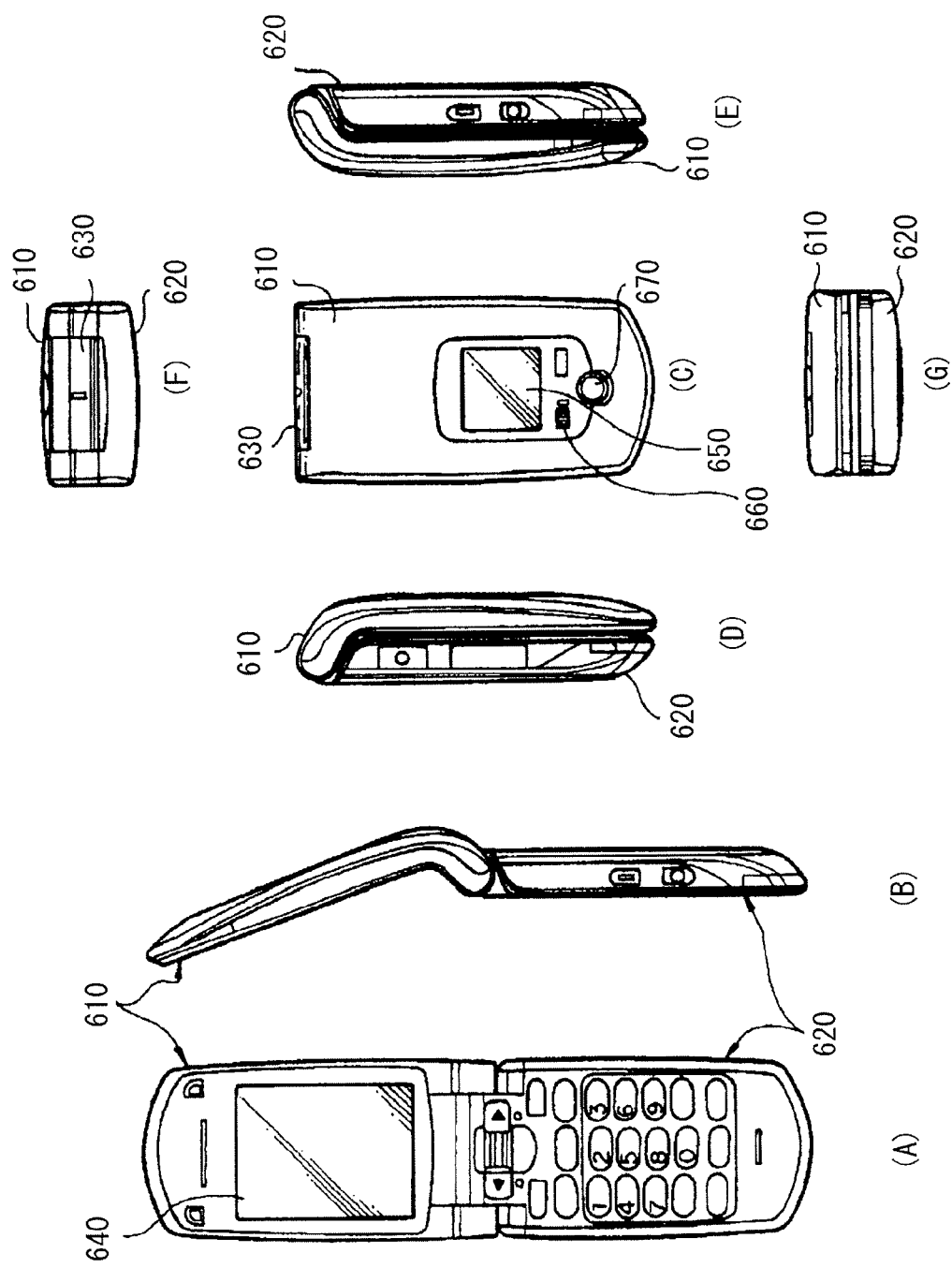
FIG. 23 is a diagram illustrating a configuration of a mobile phone that uses the display unit.

FIG. 23 illustrates an appearance configuration of a mobile phone. (A) and (B) each illustrate a front face and a side face of a state in which the mobile phone is open. (C) to (G) illustrate a front face, a left side face, a right side face, a top face, and a bottom face, respectively, of a state in which the mobile phone is closed. The mobile phone may be configured, for example, of an upper housing 610 and a lower housing 620 that are connected by a connection section (a hinge section) 630. The mobile phone may include, for example, a display 640 (the display unit 1), a sub-display 650, a picture light 660, and a camera 670.

Description has been given above referring to embodiments; however, the content of the present disclosure is not limited to the modes described in the embodiments and the like, and various modifications may be made. For example, in the above-described embodiments, description has been given of the case where color display is performed mainly using the three colors of R, G, and B. However, the display unit of the present disclosure is also applicable to a case where color display is performed using four colors additionally including W. Also in the case of using a W pixel, diffusely-reflected light derived from the display layer causes leakage of other color light (for example, light of the respective colors of R, G, and B) into the W pixel region, or leakage of W light into the R pixel, the G pixel, and the B pixel as described above. However, variation in chromaticity resulting from this leakage of light into the W pixel is difficult to be perceived by human eyes. Specifically, an acceptable color difference $\Delta xy(t)$ in the W pixel is sufficiently larger than the color differences $\Delta xy(t)$ of R, G, and B described above. The same is also applicable to leakage of the W light into each of the pixels of R, G, and B. For this reason, also in a case of adopting a four-sub-pixel configuration in which the W pixel is arranged in addition to the three pixels of R, G, and B, the setting of the upper limit of the distance Da described above is applicable, and effects equivalent to those of the above-described embodiments are therefore achieved.

Moreover, in the above-described embodiment, description is given referring to, as an example, the case where the distance Da is set to be not more than 25% of the pixel pitch Db by reducing the thickness of the transparent base 35 that is arranged between the display layer 30 and the color filter 22. However, the configuration of the display unit of the present disclosure is not limited to such a configuration. For example, the distance Da may be controlled by reducing the thickness of a member (such as the counter electrode 35 or the bonding layer 23) other than the transparent base 35 out of the portion corresponding to the distance Da. Moreover, in the above-described embodiment, the distance Da is made thinner by causing the pixel pitch Db to be a fixed value. However, the distance Da may be made not more than 25% of the pixel pitch Db by varying (increasing) the pixel pitch Db in reverse.

Moreover, in the above-described embodiments, there is exemplified a configuration, as the electrophoretic device 30a (the display layer 30), that includes the insulating liquid 31, the electrophoretic device 32, and the porous layer 33. However, the configuration of the display layer 30 is not limited to such a configuration using the porous layer 33. The configuration of the display layer 30 may be any configuration as long as the configuration is capable of utilizing the electrophoresis phenomenon to form contrast by light reflection for each pixel.

It is to be noted that the present disclosure may have the following configurations.

(1)

A display unit including:

a display layer including a plurality of pixels each including an electrophoretic device; and a color filter provided on a display side of the display layer and including filter layers each having one of a plurality of colors, the filter layers facing the respective pixels, wherein a distance between the display layer and the color filter is not more than 25 percent of a pixel pitch in the display layer.

(2)

The display unit according to (1), wherein the distance is not more than 17 percent of the pixel pitch.

(3)

The display unit according to (1) or (2), wherein the distance is not more than 10 percent of the pixel pitch.

(4)

The display unit according to any one of (1) to (3), wherein the distance is not more than 9 percent of the pixel pitch.

(5)

The display unit according to any one of (1) to (4), wherein the distance is not more than 7 percent of the pixel pitch.

(6)

The display unit according to (1), wherein the distance is not more than 12 percent of the pixel pitch.

(7)

The display unit according to any one of (1) to (6), wherein the plurality of pixels include pixels of three colors of R (red), G (green), and B (blue).

(8)

The display unit according to any one of (1) to (6), wherein the plurality of pixels include pixels of four colors of R (red), G (green), B (blue), and W (white).

(9)

The display unit according to (8), wherein the pixels of the four colors are arranged side by side in one direction, or are arranged in regions in a two-by-two matrix.

(10)

The display unit according to any one of (1) to (9), wherein a positional displacement between a center position of each of the filter layers in the color filter and a center position of the pixel is not more than 10 percent of the pixel pitch.

(11)

The display unit according to any one of (1) to (10), wherein the display layer includes a porous film, insulating liquid, and a plurality of electrophoretic particles, the porous film being formed of a fibrous structure.

(12)

The display unit according to any one of (1) to (11), further including:
an electrode;
a support substrate; and
a bonding layer,
the electrode, the support substrate, and the bonding layer being arranged between the display layer and the color filter in order from the display layer.

(13)

An electronic apparatus provided with a display unit, the display unit including:
a display layer including a plurality of pixels each including an electrophoretic device; and
a color filter provided on a display side of the display layer and including filter layers each having one of a plurality of colors, the filter layers facing the respective pixels, wherein
a distance between the display layer and the color filter is not more than 25 percent of a pixel pitch in the display layer.

This application claims the priority on the basis of Japanese Patent Application JP 2012-071482 filed Mar. 27, 2012 in Japan Patent Office, the entire contents of each which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display unit, comprising:
a display layer that includes a plurality of pixels, wherein each pixel of the plurality of pixels has an electrophoretic device;
a color filter provided on a display side of the display layer and that includes a plurality of filter layers that face respective pixels of the plurality of pixels,
wherein each filter layer of the plurality of filter layers has one of a plurality of colors, and
wherein a distance between the display layer and the color filter is less than or equal to 25 percent of a pixel pitch in the display layer.

2. The display unit according to claim 1, wherein the distance is less than or equal to 17 percent of the pixel pitch.

3. The display unit according to claim 2, wherein the distance is less than or equal to 10 percent of the pixel pitch.

4. The display unit according to claim 3, wherein the distance is less than or equal to 9 percent of the pixel pitch.

5. The display unit according to claim 4, wherein the distance is less than or equal to 7 percent of the pixel pitch.

6. The display unit according to claim 1, wherein the distance is less than or equal to 12 percent of the pixel pitch.

7. The display unit according to claim 1, wherein the plurality of pixels include pixels of three colors of R (red), G (green), and B (blue).

8. The display unit according to claim 1, wherein the plurality of pixels include pixels of four colors of R (red), G (green), B (blue), and W (white).

9. The display unit according to claim 8, wherein the pixels of the four colors are arranged side by side in one direction, or are arranged in regions in a two-by-two matrix.

10. The display unit according to claim 1, wherein a positional displacement between a center position of each filter layer of the filter layers in the color filter and a center position of the pixel is less than or equal to 10 percent of the pixel pitch.

11. The display unit according to claim 1, wherein the display layer includes a porous film, insulating liquid, and a plurality of electrophoretic particles, the porous film is of a fibrous structure.

12. The display unit according to claim 1, further comprising:
an electrode;
a support substrate; and
a bonding layer,
the electrode, the support substrate, and the bonding layer are arranged between the display layer and the color filter in order from the display layer.

13. An electronic apparatus, comprising:
a display unit that comprises:
a display layer that includes a plurality of pixels, wherein each pixel of the plurality of pixels includes an electrophoretic device; and
a color filter provided on a display side of the display layer and that includes a plurality of filter layers that face respective pixels of the plurality of pixels,
wherein each filter layer of the plurality of filter layers has one of a plurality of colors, and
wherein a distance between the display layer and the color filter is less than or equal to 25 percent of a pixel pitch in the display layer.

* * * * *